United States Patent
Savini et al.

(10) Patent No.: US 11,680,834 B2
(45) Date of Patent: Jun. 20, 2023

(54) ELECTROMAGNETIC DETECTION DEVICE HAVING A SEALING ARRANGEMENT AND ENGAGEMENT ELEMENTS ASSOCIATED WITH DETECTION ELECTRODES

(71) Applicant: ELTEK S.p.A., Casale Monferrato (IT)

(72) Inventors: Paolo Savini, Casale Monferrato (IT); Daniele Cerruti, Casale Monferrato (IT); Roberto Grappiolo, Casale Monferrato (IT); Marco Pizzi, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 403 days.

(21) Appl. No.: 16/970,245

(22) PCT Filed: Feb. 15, 2019

(86) PCT No.: PCT/IB2019/051242
§ 371 (c)(1),
(2) Date: Aug. 14, 2020

(87) PCT Pub. No.: WO2019/159125
PCT Pub. Date: Aug. 22, 2019

(65) Prior Publication Data
US 2021/0116273 A1    Apr. 22, 2021

(30) Foreign Application Priority Data
Feb. 16, 2018   (IT) .................. 102018000002753

(51) Int. Cl.
*G01F 1/84* (2006.01)
*G01F 1/58* (2006.01)
*G01F 1/60* (2006.01)

(52) U.S. Cl.
CPC .............. *G01F 1/584* (2013.01); *G01F 1/588* (2013.01); *G01F 1/60* (2013.01)

(58) Field of Classification Search
None
See application file for complete search history.

(56) References Cited

U.S. PATENT DOCUMENTS 5,224,394 A * 7/1993 Kalinoski ............... G01F 1/584
73/861.12
5,925,830 A     7/1999 Schalk
(Continued)

FOREIGN PATENT DOCUMENTS

EP    2 469 244     6/2012
WO    2008/074740   6/2008

OTHER PUBLICATIONS

"Medical uses of silver", Wikipedia, Feb. 13, 2018, XP05508849, retrieved Sep. 21, 2018, 6 pages.
(Continued)

*Primary Examiner* — Harshad R Patel
(74) *Attorney, Agent, or Firm* — Nixon & Vanderhye P.C.

(57) ABSTRACT

A detection device for a liquid-conducting appliance includes a hydraulic body (2) defining a duct (3) for a flow of a liquid, and a flow sensor on the hydraulic body (2), which includes an electromagnetic arrangement and a detection arrangement. The detection arrangement includes two electrode units (20) for detecting a potential difference induced by the flow of the liquid through an electromagnetic field generated by the electromagnetic arrangement. The hydraulic body (2) has two through openings on two opposite sides (3a, 3b) of the duct (3), inserted in each of which is a corresponding electrode unit (20), in such a way that the electrode units (20) are opposed to one another and in contact with the liquid. The device (1) includes sealing elements at each through opening, for preventing leakage of the liquid from the duct (3).

10 Claims, 15 Drawing Sheets

(56) References Cited

U.S. PATENT DOCUMENTS

| | | | |
|---|---|---|---|
| 8,915,146 | B2 | 12/2014 | Kerrom et al. |
| 9,568,346 | B2 | 2/2017 | Ramseyer et al. |
| 2013/0086993 | A1 | 4/2013 | Kerrom et al. |
| 2018/0164139 | A1* | 6/2018 | Voigt ..................... B22F 5/106 |
| 2020/0141774 | A1* | 5/2020 | Tschudin ............ B29C 45/1671 |

OTHER PUBLICATIONS

International Search Report for PCT/IB2019/051242 dated May 8, 2019, 4 pages.

Written Opinion of the ISA for PCT/IB2019/051242 dated May 8, 2019, 10 pages.

* cited by examiner

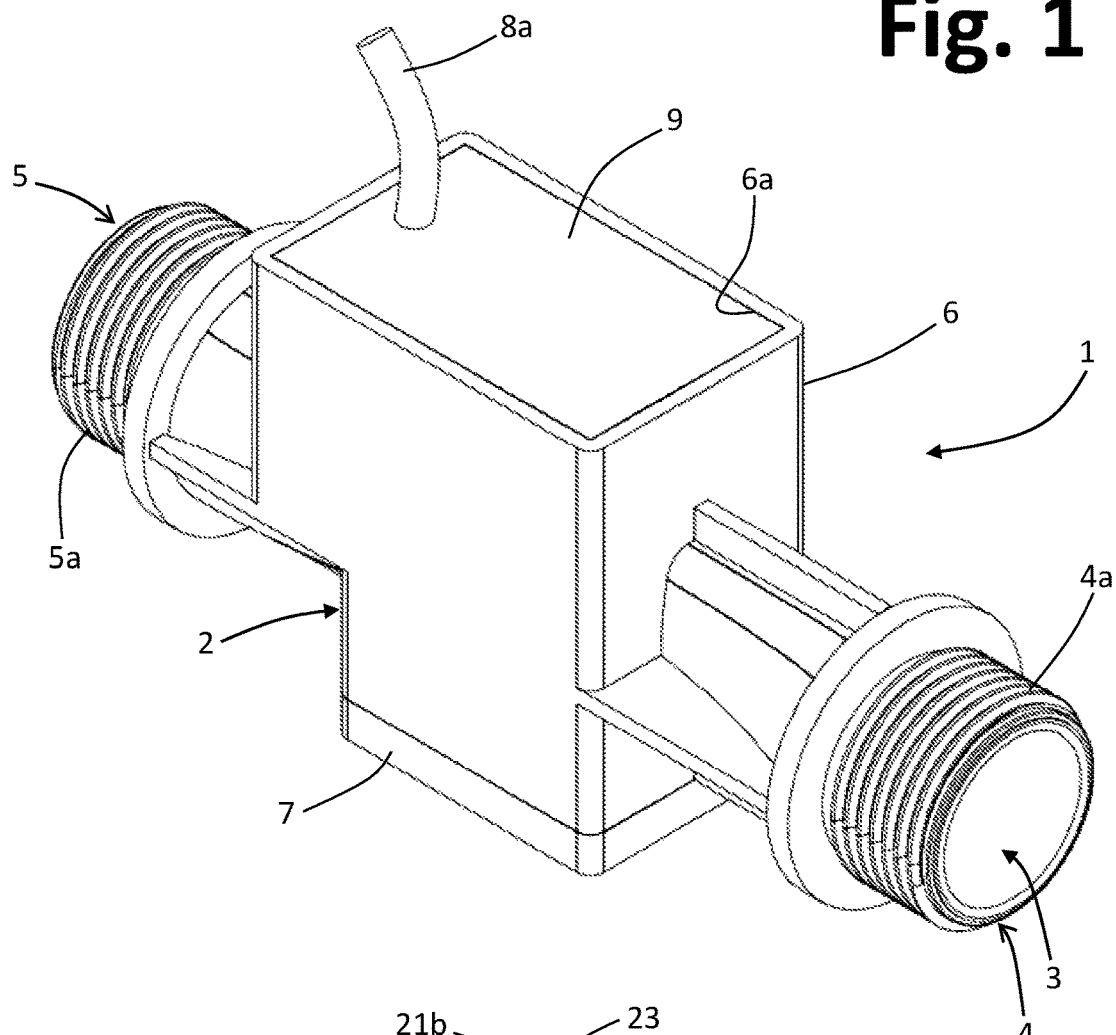
Fig. 1
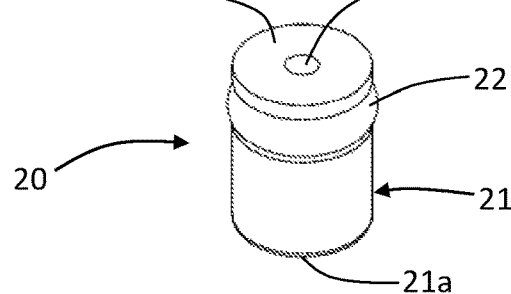
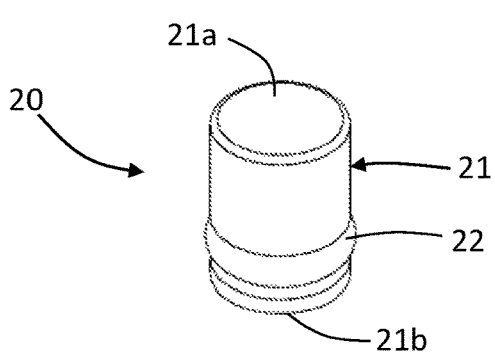
Fig. 5

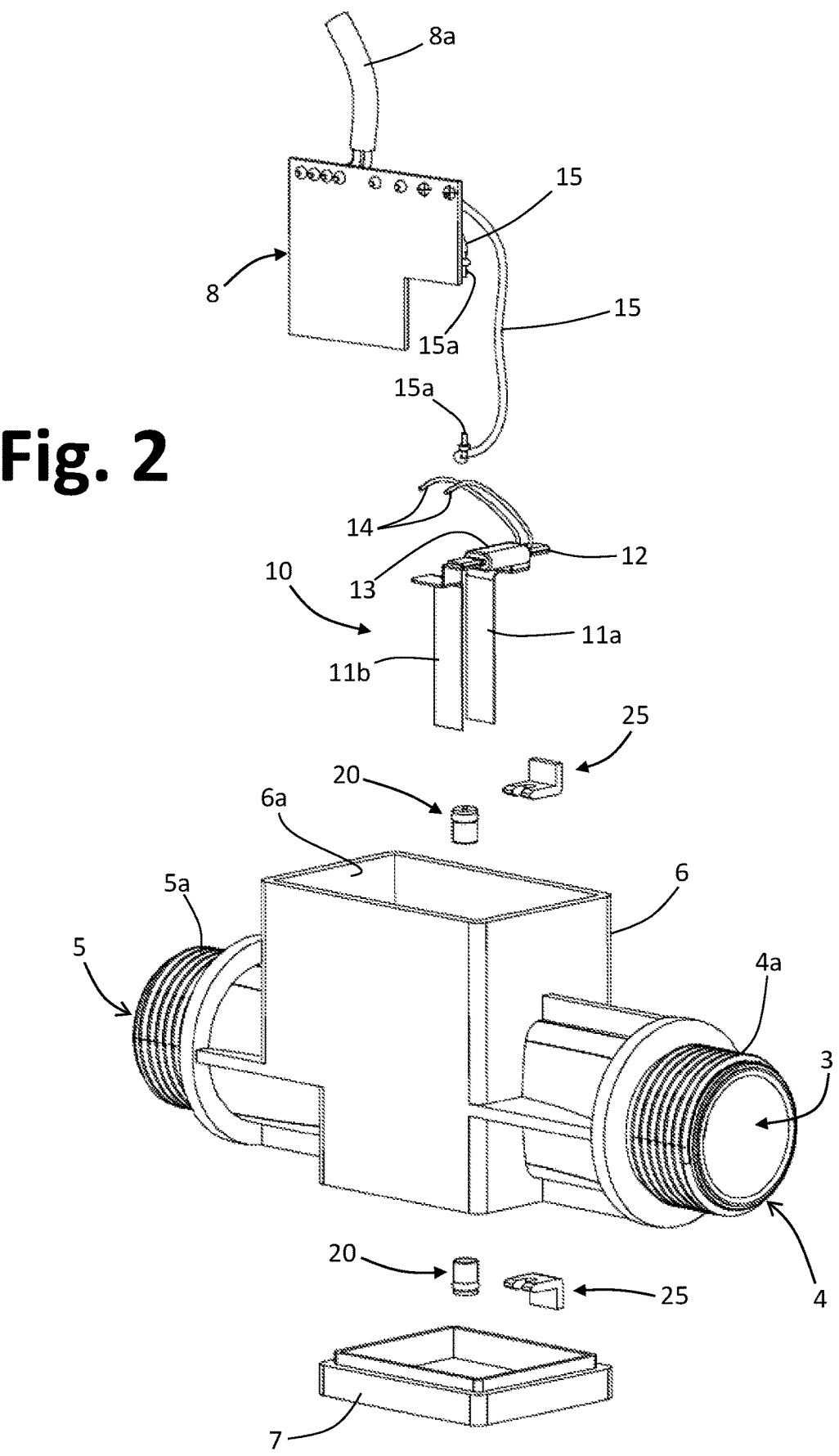

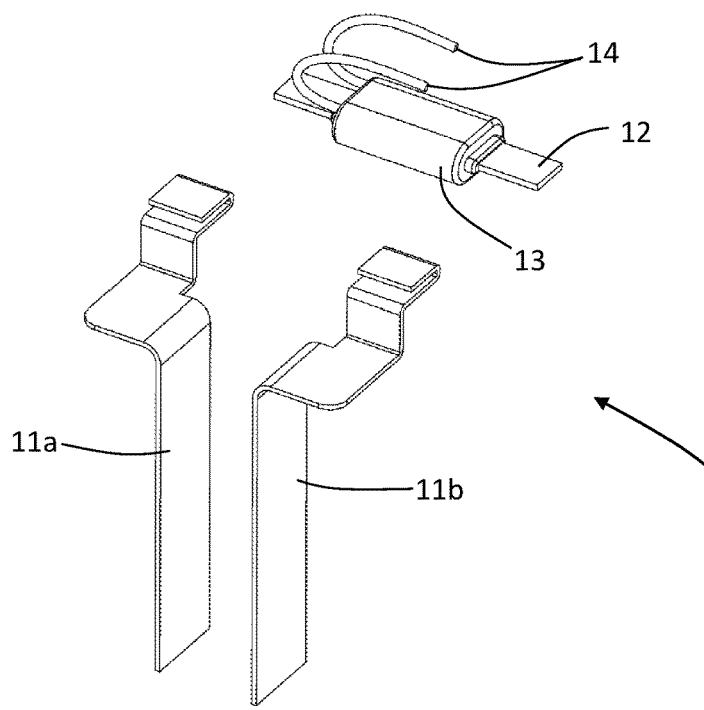
Fig. 4
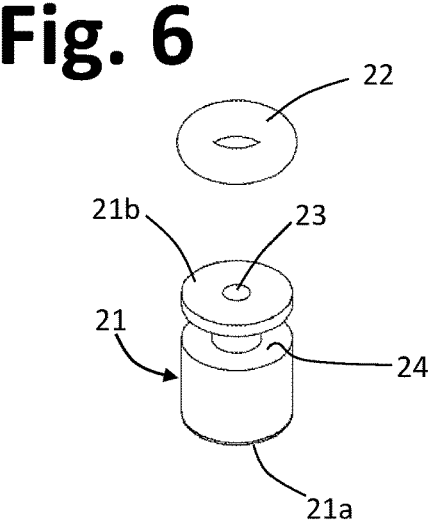
Fig. 6
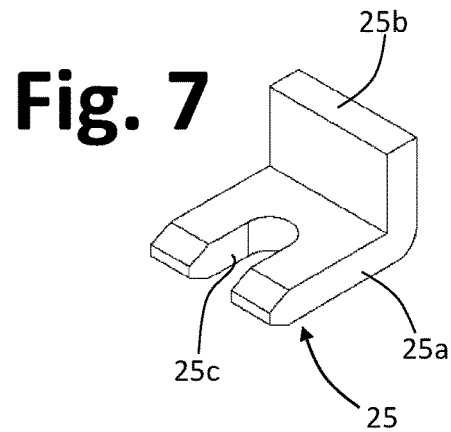
Fig. 7
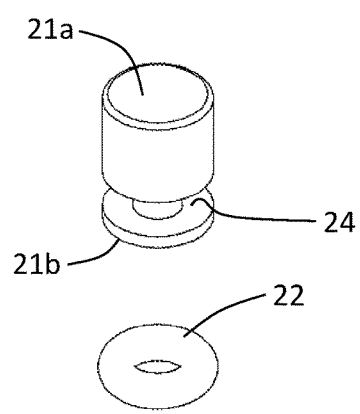
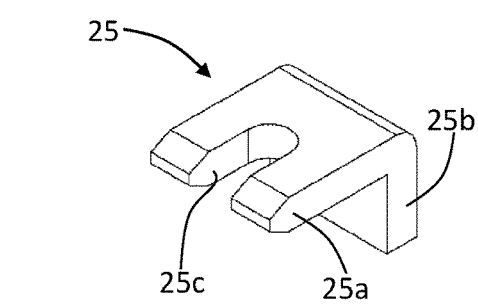

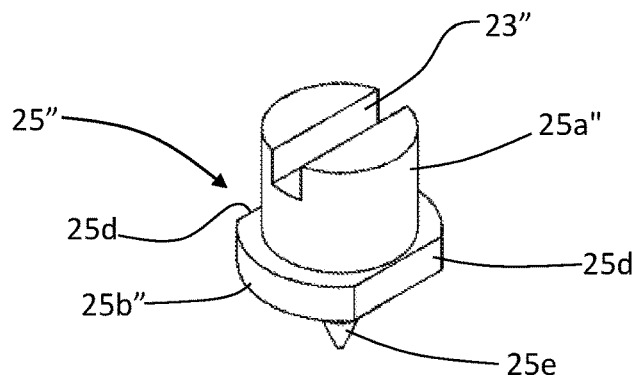
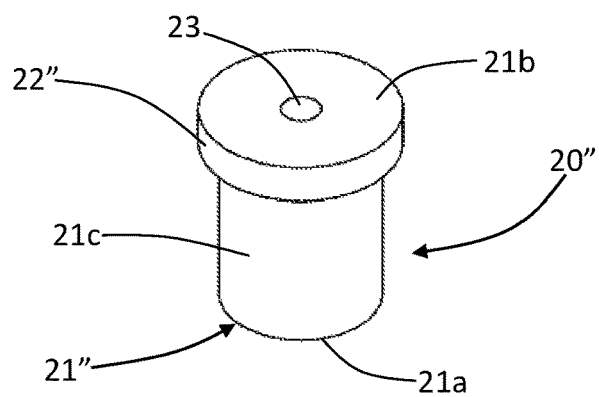
Fig. 18
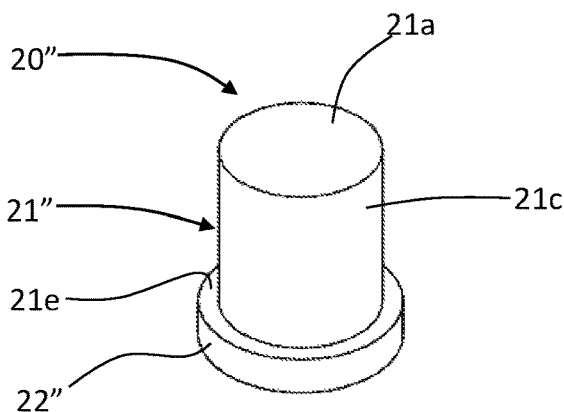
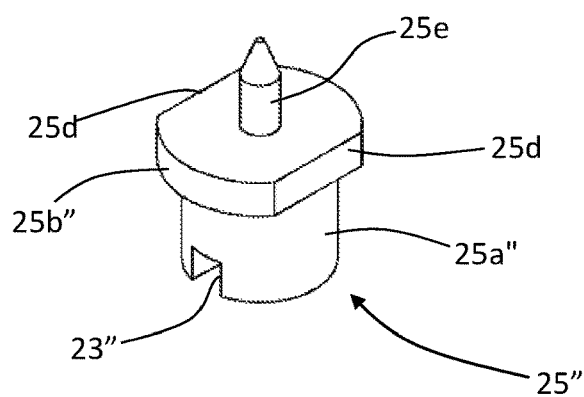

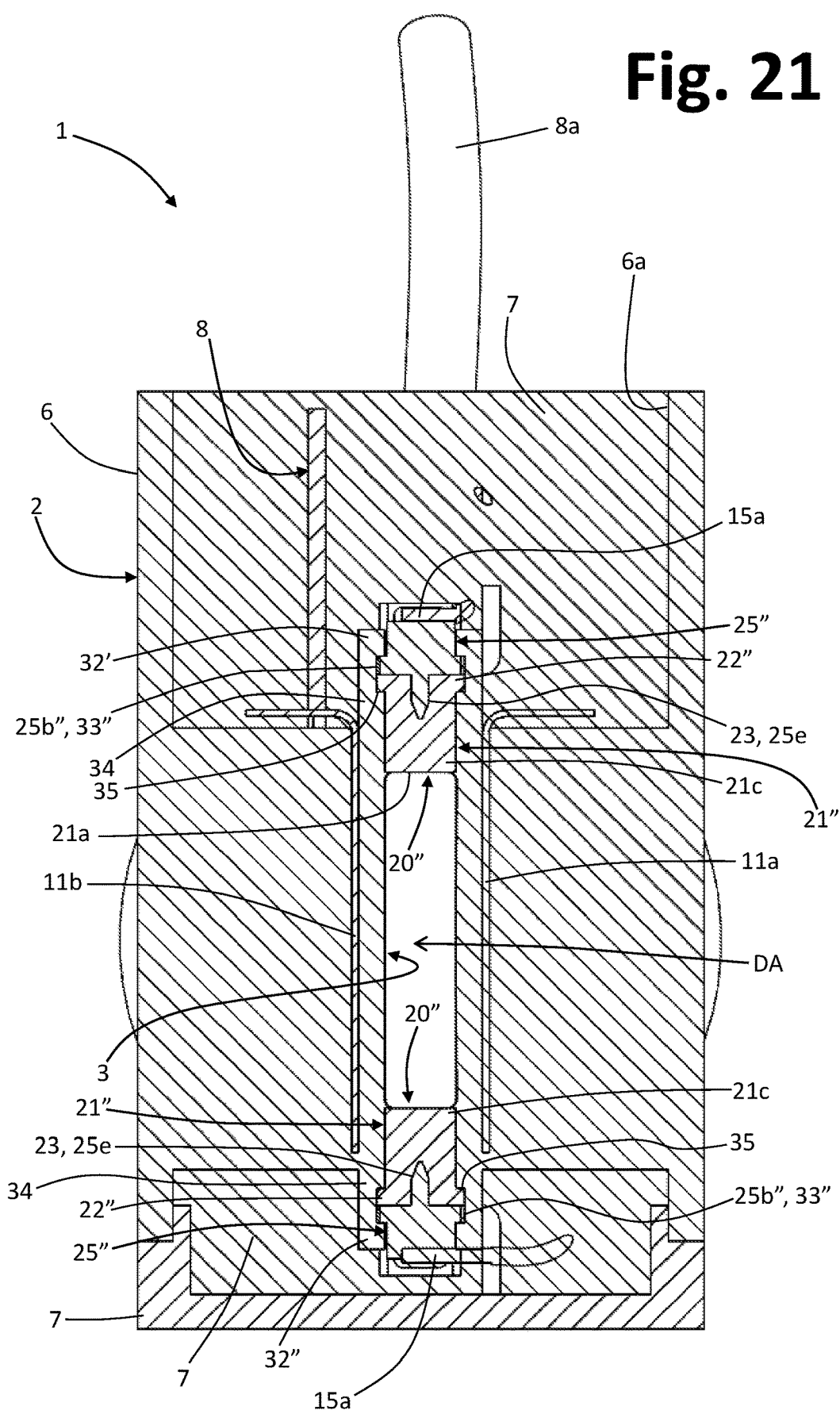

ELECTROMAGNETIC DETECTION DEVICE HAVING A SEALING ARRANGEMENT AND ENGAGEMENT ELEMENTS ASSOCIATED WITH DETECTION ELECTRODES

This application is the U.S. national phase of International Application No. PCT/IB2019/051242 filed Feb. 15, 2019 which designated the U.S. and claims priority to IT Patent Application No. 102018000002753 filed Feb. 16, 2018, the entire contents of each of which are hereby incorporated by reference.

FIELD OF THE INVENTION

The present invention relates to detection and/or control devices for liquid-conducting appliances and systems, such as devices for detecting and/or dispensing a liquid, or safety devices, in particular devices configured for connection between a generic source for supply of a liquid and an appliance using the aforesaid liquid. The invention may be applied in various sectors, such as the domestic sector, the hydro-sanitary sector, the air-conditioning sector, the vehicle sector.

More in particular, the invention regards a device of the above sort, which comprises at least:
 a hydraulic body defining a duct for a flow of a liquid, the duct having an inlet and an outlet, and being defined at least in part of an electrically insulating material;
 a flow sensor located at least in part on the hydraulic body, which comprises:
  an electromagnetic arrangement, configured for generating an electromagnetic field through said part of the duct, in a direction transverse to the flow of the liquid,
  a detection arrangement, which comprises at least two electrode units for detecting a potential difference induced by the flow of the liquid through the electromagnetic field, the at least two electrode units being arranged for being in contact with the liquid in a respective working position,
 wherein the hydraulic body has at least two through openings at two opposite sides of the duct, at least partially inserted in each of which is a corresponding electrode unit, preferably in such a way that, in the respective working positions, the electrode units are substantially aligned or opposed to one another, in particular in a direction substantially perpendicular to the flow of the liquid and to the magnetic field.

PRIOR ART

Detection and/or control devices for liquid-conducting appliances and systems, for example for electrical household appliances, are widely known. In many solutions, the aforesaid devices have at least one hydraulic body provided with a flow sensor or flow meter, for measuring an amount of a liquid delivered to the appliance or system served.

The flow sensor is in general of a mechanical type, based upon the use of an impeller set in rotation by the flow of the liquid, and of a corresponding detection unit that is able to measure the rotational speed of the impeller, i.e., the number of revolutions thereof per unit time. For this purpose, the impeller typically includes one or more magnetic inserts, and the detection unit is usually of the Hall-effect type, set in a position aligned to the impeller, on the outside of the duct in which the water flows.

Known impeller flow sensors are potentially subject to imprecision of operation, for example on account of the presence of impurities in the water coming from a water mains supply, such as silt or iron residue, which may deposit over time between the blades of the impeller and the body that houses it and thereby cause sticking of the impeller itself. Known impeller sensors moreover envisage mechanical moving parts and are hence subject to inevitable wear, which can cause further imprecisions of detection. Impeller sensors are also far from suited to detecting very small flows of liquid (for example, of a few milliliters per minute), which may typically arise in the case of minor leakages or dripping from a valve arrangement set upstream or downstream of the flow sensor.

There have also been proposed electromagnetic-induction flow sensors, operation of which is based upon Faraday's law. In summary, for the purposes of operation of such a sensor, the flow of an electrically conductive liquid that flows in an electrically insulated duct of a given diameter is made to be traversed by a magnetic flux of a given density, in a direction substantially perpendicular to the one followed by the fluid. If the fluid is electrically conductive—as is typically water of a water mains—in this way a potential difference is induced, which can be detected by means of two electrodes in contact with the fluid, which are aligned substantially perpendicular to the direction of the flow of the fluid and of the magnetic field. The value of the potential difference that can be measured via the electrodes is proportional to the average speed of the liquid in the duct: consequently, on the basis of the aforesaid value and on the basis of the size of the section of passage of the duct—which is known beforehand—it is possible to calculate the flowrate of the liquid through the duct.

Electromagnetic-induction flow sensors in general envisage that the electrodes, typically having a body of a cylindrical or prismatic shape made of metal material, or graphite, or carbon, are set on two opposite sides of the duct, facing one another and so that they can be reached by the liquid. Consequently, the two opposite sides of the duct must be provided with respective through openings for the electrodes, where the electrodes themselves are frequently drive-fitted so as to ensure autonomously fluid tightness. It is on the other hand known, and advisable, to apply in any case in an area corresponding to these openings a sealant material in order to prevent possible seepage of the liquid between the surfaces of the holes and the electrodes.

This type of embodiment is frequently far from reliable and complicates to a certain extent production of the hydraulic control device.

AIM AND SUMMARY OF THE INVENTION

In its general terms, the present invention has basically the aim to overcome one or more of the drawbacks referred to above, and in particular to provide a detection and/or control device of the type referred to above that is simple and inexpensive to produce, but distinguished by a high reliability as regards tightness.

The above and yet other objects, which will emerge more clearly hereinafter, are achieved, according to the present invention, by a detection and/or control device for liquid-conducting household appliances and systems having the characteristics referred to in the annexed claims. The claims form an integral part of the technical teaching provided herein in relation to the invention.

In summary, according to a first aspect, in a detection and/or control device of the type referred to at the start, sealing means are provided at each of the two through openings on the two opposite sides of the duct, where these sealing means are associated to, or integrated in, a respective electrode unit, in such a way that the sealing means of one electrode unit can be set in the corresponding operating position by means of the very movement of insertion of the electrode unit into the corresponding through opening, thereby simplifying production of the device. The sealing means may advantageously be made of deformable or elastically compressible material, for example an elastomer.

According to a second aspect, in a detection and/or control device of the type indicated at the start, each electrode unit comprises a body made at least in part of an electrically conductive polymer or polymeric material, or of a mixture of materials comprising at least one polymer and an electrically conductive material, to the advantage of simplicity of production.

Such a polymer or composite with polymeric base may also advantageously comprise a filler constituted by at least one substance having an inhibiting effect on proliferation of micro-organisms, such as a silver filler. This solution makes it possible to increase considerably the reliability and precision of measurement of the device, countering formation of biofilm on the surface of the electrode units exposed to the liquid, which might cause drifts in the measurement.

According to a third aspect, in a detection and/or control device of the type referred to at the start the detection arrangement comprises at least one blocking or fixing member, on the outside of the duct for the liquid, which is configured for co-operating mechanically with the hydraulic body and with a respective electrode unit in order to prevent the latter from slipping out of the corresponding through opening. Preferably, the hydraulic body has, on the outside of the duct and in a position corresponding to an aforesaid through opening, an engagement seat or element for the at least one blocking member. The blocking member may be possibly formed in a single body with the respective electrode unit.

Provision of a member for blocking the electrode unit that can be engaged in a corresponding seat or engagement element of the hydraulic body simplifies further production of the device, moreover eliminating the risk of the electrode unit slipping out in an undesirable way, for example as a result of a high pressure that is set up within the duct of the hydraulic body.

Preferably, the aforesaid engagement seat comprises at least one of the following:
- at least one shaped seat for receiving and/or engaging with at least one portion of the blocking member in a direction generally transverse to the corresponding through opening, this portion of the blocking member having, in particular, a substantially fork-like or else dowel-like configuration;
- a thread on which a complementary thread defined by the blocking member can be screwed, the blocking member being in particular configured substantially as a screwable cap;
- two opposed guides or recesses, in which corresponding opposed portions of the blocking member can engage, preferably following upon partial rotation of the latter about an axis of its own, or else with a coupling of a substantially bayonet type.

The aforesaid possible solutions are distinguished by a high simplicity of construction and assembly, at the same time guaranteeing a high quality of fixing of the electrode units in position.

In various embodiments the electrode unit comprises:
- an electrically conductive body made at least in part of a substantially stiff material, preferably a metal material (including metal alloys) or an electrically conductive polymer, having a first axial end and a second axial end, which are designed to be in contact with and isolated from the liquid, respectively;
- a sealing element made of elastically compressible material, which provides the aforesaid sealing means and is mounted or moulded on the electrically conductive body in a corresponding seat, which is defined in an intermediate position between the two aforesaid axial ends.

In this way, the sealing element, for example an annular gasket, can be brought into its operating position by exploiting insertion of the electrode unit into the corresponding through opening, within which the element itself will come to be located in a deformed or radially compressed condition so as to guarantee tightness. The sealing element, in the deformed or compressed condition thereof, can also contribute to holding the electrically conductive body of the assembly in position.

In other embodiments, the electrode unit comprises, instead, an electrically conductive body made at least in part of deformable or elastically compressible material, with the aforesaid sealing means that can hence being provided by, or integrated in, the aforesaid electrically conductive body made of deformable or elastically compressible material. This simplifies production of the device, moreover reducing its costs.

In various embodiments, the aforesaid deformable or elastically compressible material is an electrically conductive polymer or plastic, preferably a thermoplastic polymer or a co-continuous polymer filled with electrically conductive particles, or an electrically conductive elastomer, preferably an elastomer of a silicone type filled with electrically conductive particles.

The axial end of the electrically conductive body isolated from the liquid may comprise a widened head, which defines or has associated a sealing element at a surface thereof facing a corresponding outer surface of the hydraulic body that surrounds the through opening for the electrode unit: when the electrode unit is blocked in the respective working position, the sealing element is in its operating position, for example axially compressed or partially co-penetrated in the hydraulic body. The functions of fluid tightness are thus further improved.

The aforesaid widened head, when it is made of the aforesaid deformable or elastically compressible material, may in any case be without the aforesaid sealing element, in which case an annular surface thereof can directly face a corresponding outer surface of the hydraulic body that surrounds the through opening for the electrode unit. The electrically conductive body made of such a deformable or elastically compressible material preferably has a stem of its own, belonging to which is the axial end of the body itself designed for contact with the liquid. With the electrode unit blocked in position, the widened head is at least in part axially deformed or compressed and/or the stem is at least in part in a condition radially compressed within the corresponding through opening, thereby guaranteeing good characteristics of tightness.

The electrode unit may hence comprise an electrically conductive body made of a deformable or elastically compressible material, designed to ensure axial and/or radial tightness, in particular with respect to an outer surface of the hydraulic body and/or within the corresponding through opening.

In various embodiments, the axial end of the electrically conductive body that is to be isolated from the liquid may define directly a connection seat or area for the connection end of a corresponding electrical lead, in particular an axial blind seat.

In other embodiments, instead, such a connection seat or area is defined in the blocking member, which is made of electrically conductive material and is mounted electrically in contact with an electrically conductive body of the respective electrode unit. Possibly, the blocking member may also include an axially projecting coupling element, which is engaged in a condition of electrical contact with a corresponding axial blind seat that opens at the end of an electrically conductive body of the respective electrode unit. Each of these solutions facilitates the electrical connection of the electrode units, at the same time increasing the quality of connection.

BRIEF DESCRIPTION OF THE DRAWINGS

Further objects, characteristics, and advantages of the invention will emerge clearly from the ensuing detailed description, with reference to the annexed drawings, which are provided purely by way of explanatory and non-limiting example and in which:

FIG. 1 is a schematic perspective view of a detection and/or control device according to possible embodiments of the invention;

FIG. 2 is a partially exploded schematic view of a detection and/or control device according to possible embodiments of the invention;

FIG. 4 is a partially exploded schematic view of an electromagnetic arrangement of a detection and/or control device according to possible embodiments of the invention;

FIG. 5 is a schematic perspective view of two electrode units that belong to a detection arrangement of a detection and/or control device according to possible embodiments of the invention;

FIG. 6 is an exploded schematic view of the two electrode units of FIG. 5;

FIG. 7 is a schematic perspective view of two blocking members that belong to a detection arrangement of a detection and/or control device according to possible embodiments of the invention;

FIG. 18 is a schematic perspective view of two electrode units, with corresponding blocking members, that belong to a detection arrangement of a detection and/or control device according to further possible embodiments of the invention;

FIG. 21 is a schematic cross-sectional view of a detection and/or control device according to further possible embodiments of the invention.

DETAILED DESCRIPTION OF PREFERRED EMBODIMENTS OF THE INVENTION

Figure 3:
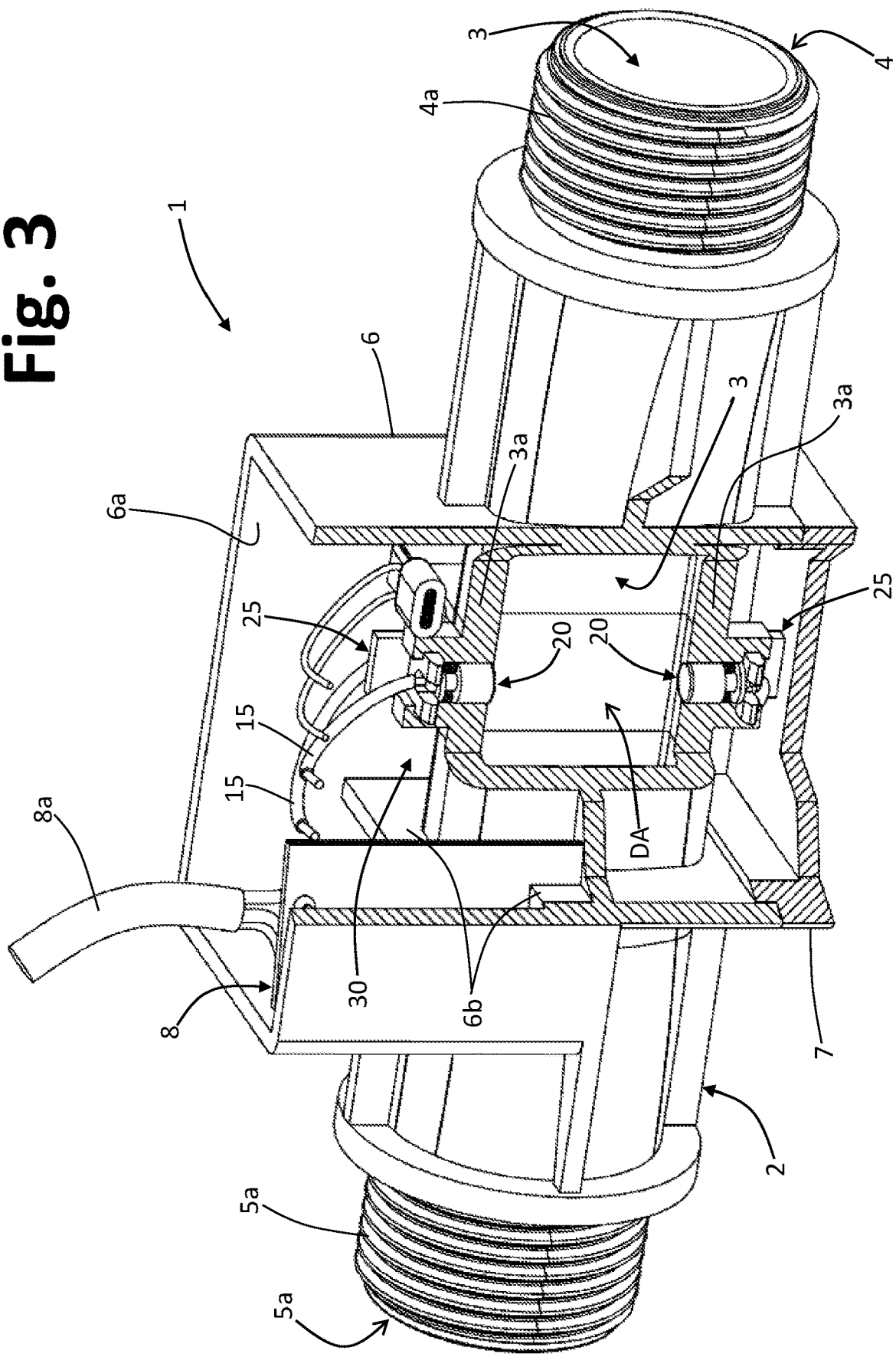
FIG. 3 is a partial and schematic sectioned perspective view of a detection and/or control device according to possible embodiments of the invention.

Reference to "an embodiment", "one embodiment", "various embodiments", and the like in the course of this description is meant to indicate that at least one particular configuration, structure, or characteristic described in relation to an embodiment is comprised in at least one embodiment. Hence, phrases such as "in an embodiment", "in one embodiment", "in various embodiments", and the like that may be present in various points of this description do not necessarily refer to one and the same embodiment, but may, instead, refer to different embodiments. Moreover, particular conformations, structures, or characteristics defined in the course of this description may be combined in any adequate way in one or more embodiments, even different from the ones represented. The reference numbers and spatial references (such as "upper", "lower", "top", "bottom", "front", "back", "vertical", etc.) used herein, in particular with reference to the examples in the figures, are only provided for convenience and hence do not define the sphere of protection or the scope of the embodiments. In the present description and in the attached claims, the generic term "liquid" is to be understood as comprising water or other liquids used in the domestic field or on vehicles, including mixtures and solutions containing water and/or other liquids, and the generic term "material" is to be understood as including also mixtures, compositions, or combinations of a number of different materials. Likewise, the generic definition "liquid-conducting appliances and systems" must be understood as comprising all those devices, appliances, installations, and systems that are supplied or that, more in general, use or envisage circulation or storage of at least one liquid. In the figures, the same reference numbers are used to designate elements that are similar or technically equivalent to one another.

Represented schematically in FIG. 1 is a detection and/or control device according to possible embodiments of the invention, pre-arranged for the purposes of detecting a flow of a liquid, in particular for measuring a flowrate or amount of the aforesaid liquid, as described hereinafter. In what follows, it is to be assumed that this device, designated by 1, is used for the purposes of measuring the volume of a generic electrically conductive liquid at inlet to an appliance or system served, for example water of a water mains or of a municipal water system, such as a domestic water mains exploited for supplying an electrical household appliance.

The device 1 has a hydraulic body 2, preferably made of electrically insulating material, for example a thermoplastic material. In various embodiments, such as the one exemplified, the body 2 is made of a single moulded piece, but in other embodiments the body 2 may be made up of a number of distinct pieces joined together, for example welded.

The hydraulic body 2 defines a duct 3 for the flow of a liquid, having an inlet 4 and an outlet 5. For this purpose, the body 2 defines an inlet fitting 4a, for example designed for connection to a source of the liquid, and an outlet fitting 5a, for example designed for connection to a liquid-conducting appliance or system, which must be fed with the liquid supplied through the aforesaid source. In the example, the fittings 4a and 5a extend substantially in one and the same axial direction, but in other embodiments they may be angled with respect to one another. Once again with reference to the non-limiting example illustrated, the fittings 4a and 5a are threaded fittings, but other fitting arrangements are obviously possible, for example based upon the use of rotatable ringnuts and/or bayonet couplings and/or pins or cotter pins, preferably comprising corresponding engagement seats and/or reliefs.

The device 1 integrates in the hydraulic body 2 at least part of a flow sensor, designed to generate signals or information representing the speed, and hence the amount, of flow of liquid that flows in the duct 3, it being possible for the aforesaid signals or information to be used, for example, by a control system of the appliance or system served. For example, the information that can be acquired from the flow sensor may be used by the aforesaid control system, such as the control system of an electrical household appliance, for the purposes of measurement and/or dosage of the amount of a liquid to be loaded each time, in particular for carrying out a treatment program, and/or for detecting leakages or faults of closing of a corresponding loading solenoid valve.

To return to FIG. 1, in various embodiments, the hydraulic body 2 defines—in an intermediate position between the fittings 4a and 5a—a substantially boxlike portion 6, which preferably surrounds the duct 3 and which, as may also be seen in FIGS. 2 and 3, has a respective cavity 6a.

In various embodiments, mounted within the cavity 6a is an electrical and/or electronic circuit comprising a circuit support, for example a PCB with corresponding electrical and/or electronic components, hereinafter also referred to only as "circuit support" or "support" and designated as a whole by 8 in FIG. 2. Preferably connected to the circuit support are an electromagnetic arrangement and a detection arrangement of the type mentioned previously.

The circuit support 8 can be fixed in position in any known way, for example exploiting seats, reliefs, or positioning walls (such as the ones designated by 6b in FIG. 3). Electrically connected to the circuit support 8 are the leads or conductors of a cable 8a, for carrying a supply voltage and/or signals, for example signals representing detections of flow or flowrate.

Visible in FIG. 2 are the circuit support 8, as well as an electromagnetic arrangement and a detection arrangement that can be used in a device according to the invention, the electromagnetic arrangement being designated as a whole by 10, and the detection arrangement including two electrode units designated by 20. On the circuit support 8 there may, for example, be provided the various electrical and electronic components for conditioning and processing the signals generated via the detection arrangement that includes the electrode units 20, as well as for supplying a coil of the electromagnetic arrangement 10 (and possibly for controlling valve means, when the device 1 envisages them).

An example of electromagnetic arrangement 10 is represented schematically also in FIG. 4. As already mentioned, in various embodiments, this arrangement has a generally U-shaped configuration: for this purpose, in various embodiments, the arrangement 10 comprises two magnetic-pole parts 11a and 11b—also referred to hereinafter as "magnetic poles" or simply "poles"—made of ferromagnetic material, which are generally parallel and/or symmetrical, and are connected together by means of a core 12, which is also made of ferromagnetic material, arranged or wound on which is an electrical coil 13, with corresponding supply conductors 14, for example provided for connection to the circuit support 8 of FIG. 1. The core 12 may advantageously be made of materials with high remanent magnetization (semihard materials). The poles 11a and 11b are preferably the same as one another. Preferably, the poles and/or the core are/is in the form of a plate, preferably shaped.

In various embodiments, the electrode units 20 of the detection arrangement are configured for detecting a potential difference induced by the flow of the liquid through the electromagnetic field generated by the electromagnetic arrangement 10, where the two electrode units 20 are designed to be at least in part in contact with the liquid in a respective working position. As will be seen, in various embodiments, the hydraulic body 2 has at least two through openings at two opposite sides of the duct 3, at least partially inserted in each of which is a corresponding electrode unit 20. As may be seen, for example, in FIG. 3, the positioning is such that, in the respective working positions, the electrode units 20 are preferably aligned to one another, very preferably in a direction substantially perpendicular to the flow of the liquid and to the magnetic field.

According to an inventive aspect, an electrode unit, or each electrode unit, integrates or has associated sealing means that can be positioned with respect to the corresponding through opening by means of the very movement carried out for inserting the electrode unit into the corresponding through opening. In various embodiments, the sealing means are deformable or elastically compressible.

An example of electrode units 20 is represented schematically in FIGS. 5 and 6, respectively in perspective view and in exploded view. In various embodiments, each electrode unit 20 comprises an electrically conductive body 21, which, in the case now being exemplified, is made at least in part of a stiff material, preferably a metal material, such as bronze or brass (in other embodiments the stiff material may in any case be a polymer or an electrically conductive stiff plastic). The body 21 is preferably, but not necessarily, at least in part cylindrical.

The body 21 has a first axial end 21a, or front, and a second axial end 21b, or back, the first end being designed to face the inside of the duct 3, and the second end being designed to be in a position isolated with respect to the inside of the duct 3, for connection with an electrical conductor. The conductors or leads used for connection of the electrode units 20 are designated by 15 in FIGS. 2 and 3. In various embodiments, the surface of the end 21a that is to come in contact with the liquid is surface-treated, via deposition of conductive materials that are inert from the electrochemical standpoint, such as gold or graphite.

In various embodiments, the body 21 defines, at its end 21b, a coupling seat or area for receiving the end of a corresponding connection conductor 15. In the example of FIGS. 5-6, this seat or area is constituted by a cavity or seat 23, designed to receive inside it the end 15a of a corresponding conductor 15, in particular an axial blind seat, as may be appreciated, for example, from FIGS. 9-11. The end 15a of the conductor 15 can be rendered fixed with respect to the axial end 21b of the body 21, for example via soldering with addition of metal or electrically conductive material, such as tin, or by using an electrically conductive adhesive.

Each electrode unit 20 integrates respective sealing means, which in the example of FIGS. 5-6 are represented by at least one seal gasket or ring 22, for example of an O-ring type made of an elastically compressible material, for example an elastomer. The seal gasket or ring 22 may be mounted on the body 21 or overmoulded thereon.

For this purpose, in various embodiments, the body 21 defines, in an intermediate position between its axial ends 21a and 21b, at least one purposely provided seat 24, here defined by an annular groove or recess. Such a seat may possibly comprise internal passages, or holes, or other seats in the body 21, for example to improve passage and/or adhesion of a material that is overmoulded on the body 21 to obtain the seal gasket or ring.

The seal gasket or ring 22 has an outer diameter that is greater than the diameter of the cylindrical surface of the body 21 so as to project outwards with respect to this surface: in this way, as will be seen, when the electrode unit 20 is mounted in its working position within a respective through opening of the body 2, the ring 22 is in a radially deformed or compressed condition.

As may be noted from FIG. 3, within the cavity 6a of the boxlike portion 6, the hydraulic body 2 is preferably shaped so as to define a site or formation 30 for positioning the electromagnetic arrangement 10 and the detection arrangement comprising of the electrode units 20.

Figure 8:
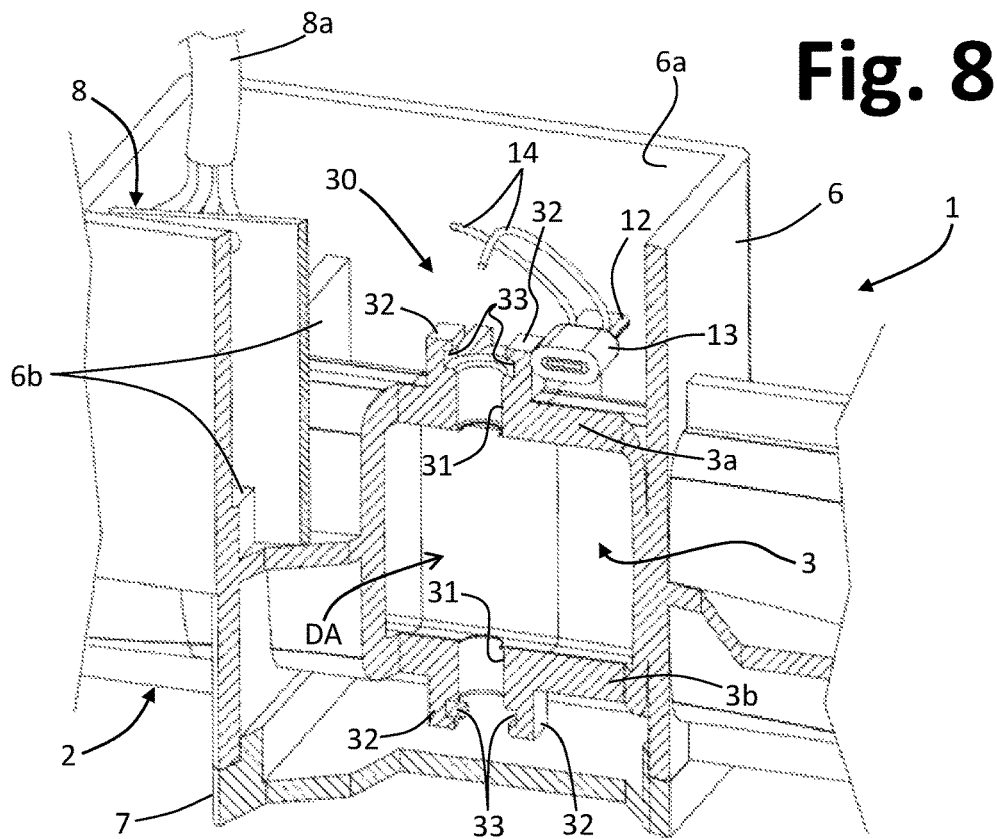
FIGS. 8 and 9 are partial and schematic sectioned perspective views of a portion of a detection and/or control device according to possible embodiments of the invention, respectively with and without a corresponding detection arrangement.
Figure 9:
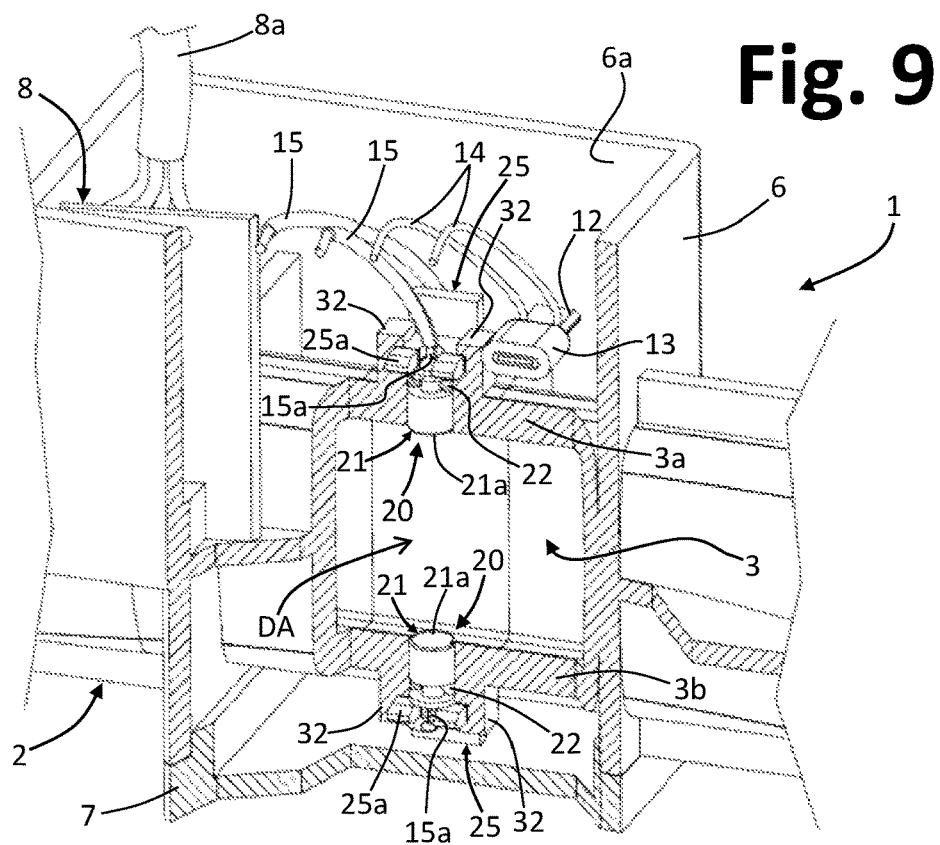
Figure 10:
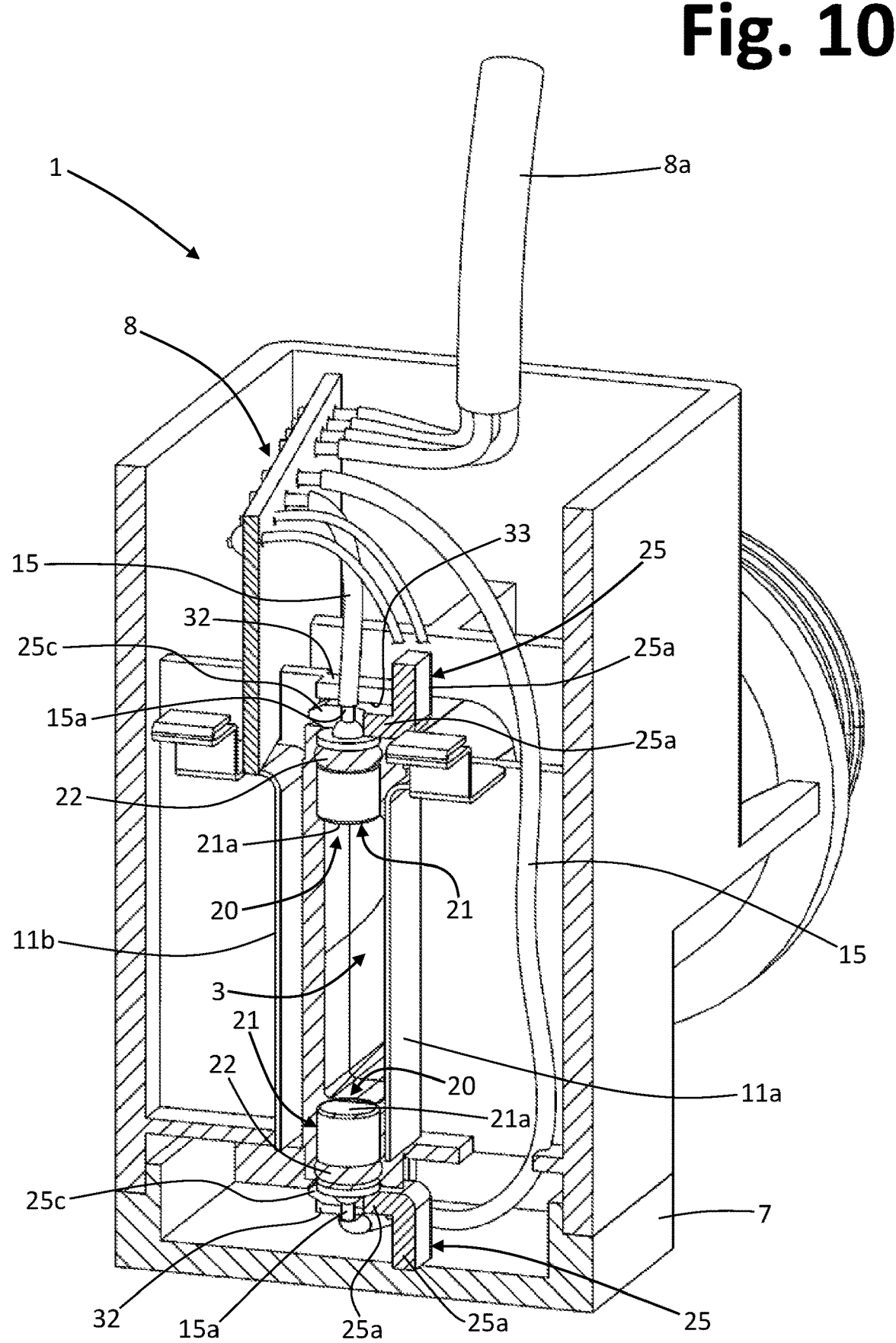
FIG. 10 is a partial and schematic sectioned perspective view of a detection and/or control device according to possible embodiments of the invention.

More in particular, as shown in FIG. 8, at two opposite sides 3a and 3b of the duct 3, the hydraulic body 2 has at least two through openings 31, which, when the device 1 is in the assembled condition, are designed to house at least partially a corresponding electrode unit 20: in this way, as shown in FIG. 9, the end 21a of the conductive body 21 of each unit 20 faces at least in part the inside of the duct 3, through the corresponding opening 31. In the example shown in FIG. 8, the through openings 31 have a substantially circular section, like the bodies 21, this shape being preferable but not imperative. As may be seen, the front of the electrode units 20 does not substantially protrudes within the duct for the liquid, being it substantially flush with the inner surface of the duct or possibly in recessed position with respect to said surface.

As may be appreciated, for the purposes of assembly of the detection arrangement, each electrode unit 20 is inserted into the corresponding through opening 31, thus obtaining with this movement also positioning of the seal ring 22 carried by each body 21. The diameter of the openings 31 substantially corresponds or is close to that of the outer cylindrical surface of the bodies 21, with the insertion that can occur either with slight interference or with slight play. With this operation also the rings 22 are inserted jointly with the bodies 21 into the respective openings 31, in a radially compressed condition, thereby guaranteeing a good fluid tightness and contributing to holding of the units 20 in the working position.

According to an inventive aspect, the detection arrangement further comprises at least one blocking member, on the outside of the duct for the liquid, which is configured for co-operating mechanically with the hydraulic body and with a respective electrode unit in order to prevent the latter from slipping out of the corresponding through opening, for example as a result of the pressure of the liquid. This solution may be particularly useful also in the case of a body 21 having an external diameter slightly smaller than the diameter of the openings 31, i.e., mounted slack or with play, for example to facilitate the steps of assembly of the device and/or facilitate possible subsequent removal of the unit 20, for example for replacement or cleaning.

For this purpose, moreover, the hydraulic body has, on the outside of the duct and in a position corresponding to a through opening thereof, at least one engagement seat or area for the respective blocking member, which possibly comprises also parts in relief and/or engagement elements and is referred to hereinafter also just as "engagement seat".

In various embodiments, the aforesaid engagement seat is shaped for receiving at least a portion of the blocking member in a direction generally transverse to a longitudinal axis of the corresponding through opening 31. FIG. 2 shows two blocking members for the units 20, designated by 25. The members 25 are visible in detail in FIG. 7, from which it may be noted how they have a respective engagement portion 25a and, preferably, a handling or assembly or arrest portion 25b, the two portions 25a and 25b being preferably substantially orthogonal to one another, i.e., with the member 25 having as a hole substantially an L shape.

In various embodiments, the engagement portion 25a is substantially fork-shaped; i.e., it has an intermediate cavity or recess 25c, aimed at enabling passage of a respective conductor 15, as explained hereinafter.

In various embodiments, the seat for the engagement portion of the blocking member is constituted by two opposed recesses. With reference, for example, to FIG. 8, at each through opening 31, and hence at the site 30, the hydraulic body 2 defines two projecting reliefs 32, substantially parallel, each of which defines a respective transverse recess or groove 33. The recesses 33 are opposed to one another and sized, in terms of height and distance, so as to be able to receive between them the engagement portion 25a of the member 25, preferably with slight interference, allowed by an albeit minimal elasticity of the plastic material used for obtaining the body 2. For the purposes of insertion of the portion 25a of the member 25 into the seat formed by the two opposed recesses 33, the portion 25a— i.e., the two parallel arms of its fork shape—may have a generally rounded or tapered front profile, as may be clearly noted, for example, in FIG. 7.

Alternatively, instead of the two recesses 33 and of the member 25, there could be provided at least one hole and at least one corresponding dowel pin, oriented transverse to the through opening 31. In such a solution, the dowel pin, or each dowel pin, may be configured so as to operate on an edge of the end portion 25b of the body 21 so as not to hinder the lead 15. Alternatively, the body 21 could also define a annular groove or perimetral seats in which the forklike part of the member 25 and/or the at least one dowel pin can be sealingly inserted. As may be appreciated, for the purposes of assembly of the detection arrangement, each electrode unit 20 is inserted into the corresponding through opening 31 of the body 2, preferably with the corresponding electrical conductor 15 already coupled to the corresponding conductive body 21 (in particular, by coupling of the end 15 of the conductor 15 into the seat 23, as shown FIGS. 5-6, and subsequent soldering). As already mentioned, with this movement also positioning of the seal rings 22 within the openings 31, in a radially compressed condition, is obtained.

At this point, the blocking members 25 are coupled with a transverse movement in the corresponding seats, i.e., in such a way that the respective engagement portions 25a will fit into the opposed recesses 33 of the reliefs 32. This transverse movement of insertion of the member 25 is not hindered by the conductor 15, which extends in a substantially axial direction from the end 21b of the electrically conductive body 21, thanks to the forklike conformation of the coupling portion 25a of the corresponding member 25, as may be clearly noted, for example, from FIGS. 9 and 10.

In various embodiments, the electromagnetic arrangement 10 can be inserted within the cavity 6a of the portion 6 of the hydraulic body 2, or in any case in such a way that the two magnetic poles 11a and 11b generally parallel to one another are located on the outside of the duct 3, with the two poles that are at two sides of the duct opposite to one another and substantially orthogonal to the sides 3a and 3b where the electrode units 20 are mounted. For the purposes of positioning, the site 30 may define corresponding seats for the poles 11a and 11b, as may be noted, for example, from FIG. 11. The seats for the poles 11a and 11b may, for example, be defined via parallel walls of the site 30, or else in some other way, for example via slits of the body 2 which are designed to receive each inside it part of the pole in question.

After positioning of the electromagnetic arrangement 10 and of the detection arrangement comprising the units 20, also the circuit support 8—connected to these arrangements by means of the conductors 14 and 15, respectively—can be positioned in the cavity 6, and the latter can be closed. In the non-limiting example represented, the cavity 6a is open at its two axial ends in order to enable positioning of the electrode units 20 and blocking thereof via the members 25. The lower end can be closed by means of a lid, such as the one designated by 7 in the figures. Final sealing can then be obtained by pouring or overmoulding an electrically insulating material into the cavity 6a, to fill the latter; this insulating material, shown only in FIGS. 1 and 11 and designated by 9, may, for example, be constituted by a suitable resin. Advantageously, also the upper end can be closed by means of a lid, possibly comprising an electrical connector with electrical terminals connected to the leads of the cable 8a. In various embodiments, the duct defined by the hydraulic body of the device according to the invention has a detection region, installed at which is the flow sensor, and in the detection region the section of passage of the duct has a substantially oblong shape.

Figure 11:
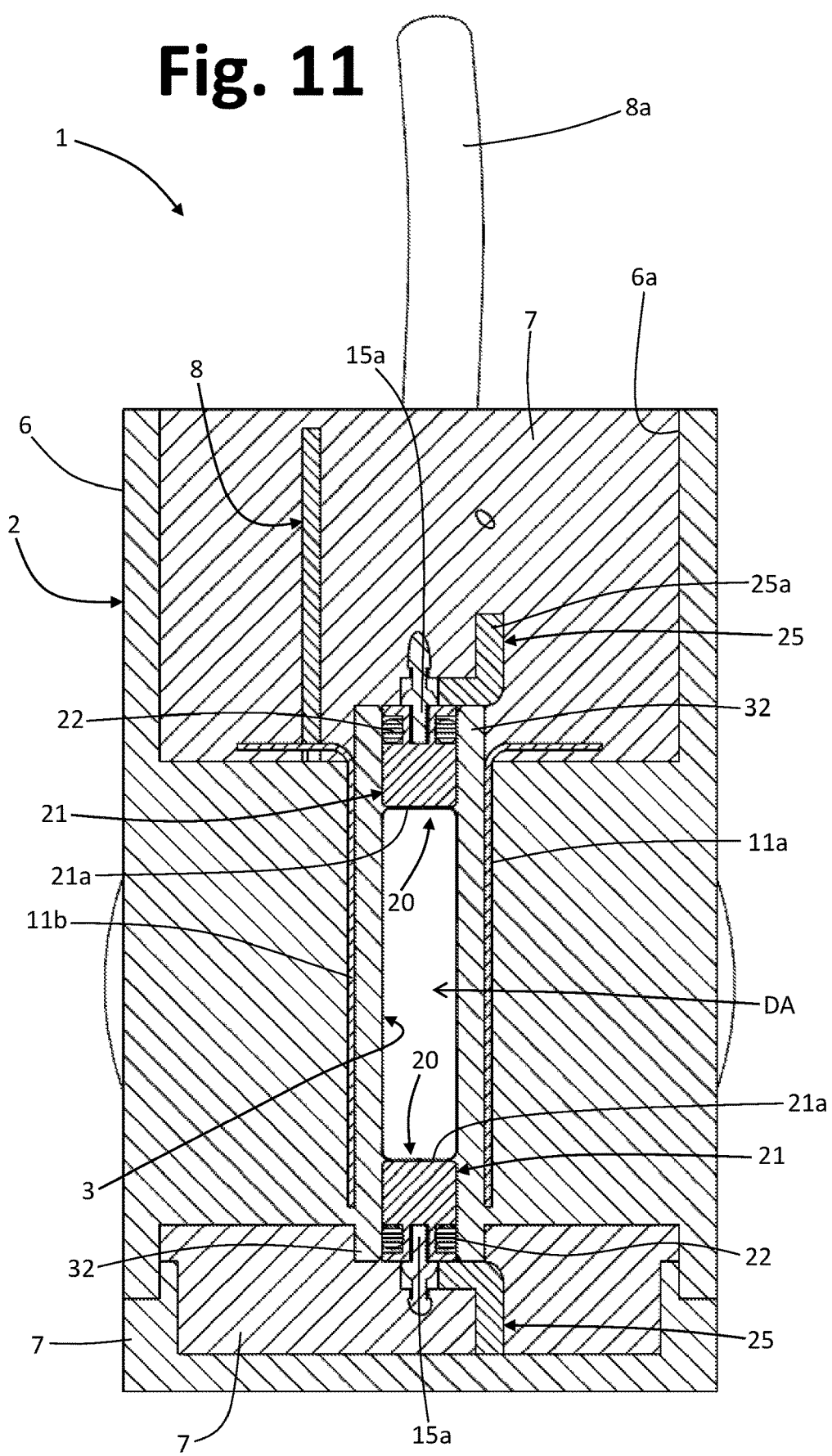
FIG. 11 is a schematic cross-sectional view of a detection and/or control device according to possible embodiments of the invention.
Figure 12:
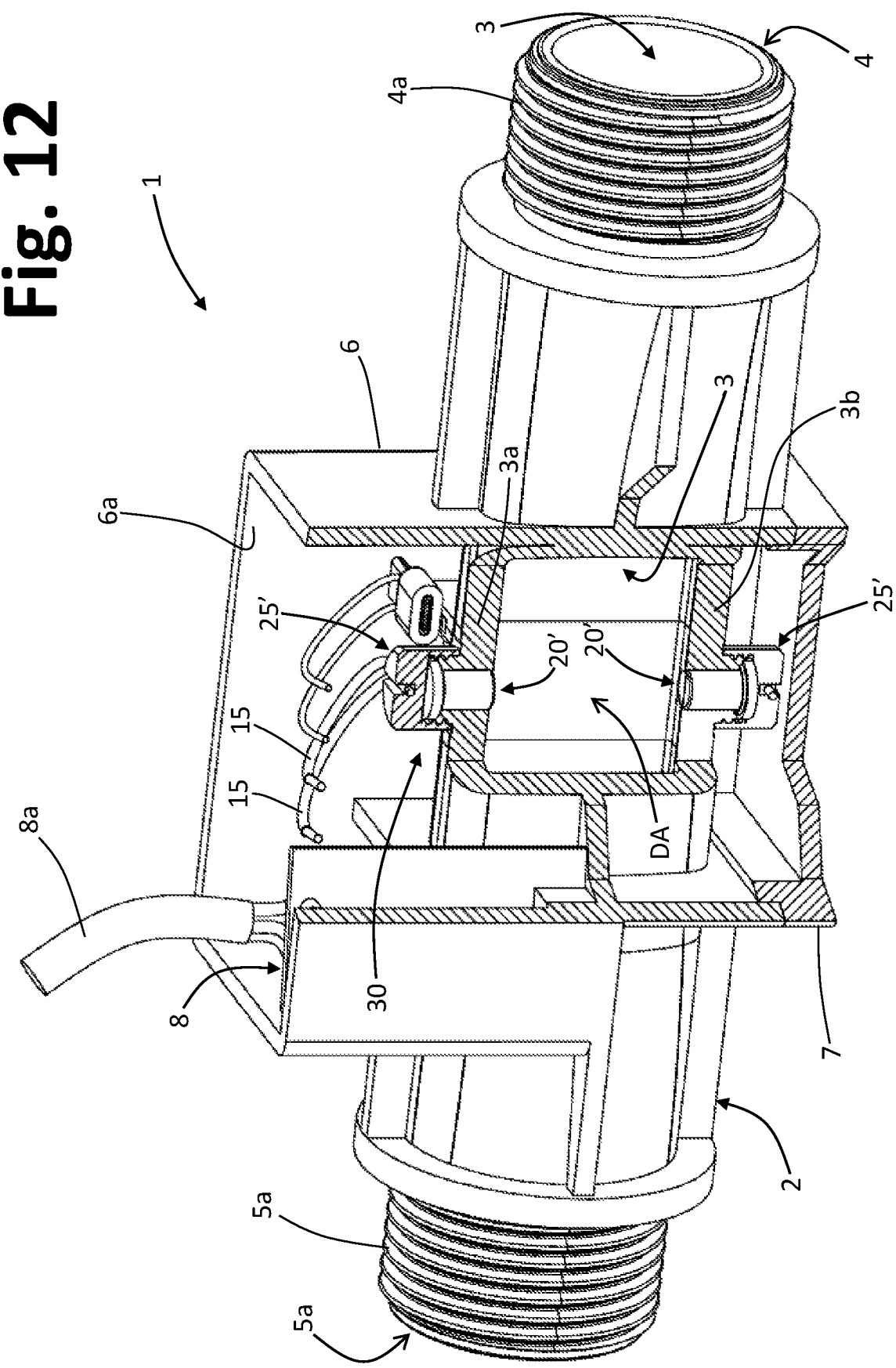
FIG. 12 is a schematic perspective view of a detection and/or control device according to other possible embodiments of the invention.

This preferential characteristic may be clearly appreciated, for example, from FIG. 11 (as well as in part from FIGS. 3 and 8-10), where the cross section of the duct 3 in the detection area—designated by DA—is substantially rectangular, with the electrode units 20 set on the opposite minor sides of the cross section and with the magnetic poles 11a and 11b substantially parallel to and on the outside of the major opposite sides of the cross section. The oblong cross section, which may also be at least approximately elliptical, makes it possible to position the electrode units 20 as far as possible from one another, at the detection area DA: the greater distance between the units 20 enables increase in the sensitivity of measurement of the potential difference.

Preferably, the conductive body 21 of at least one electrode unit 20 has a diameter or a dimension in width substantially corresponding or close to the dimension in width of a respective minor side of the aforesaid cross section of the duct 3 in the detection area.

The flow sensor that equips the device 1 operates according to modalities in themselves known.

For the purposes of detection of flowrate the coil 13 of the electromagnetic arrangement 10 is supplied, thus creating a magnetic field in the poles 11a and 11b that closes through the detection area DA of the duct 3, thereby traversing the flow of the electrically conductive liquid (which is here assumed as being water of a water mains) between the inlet 4 and the outlet 5 of the duct itself.

The presence of a magnetic field transverse to the flow of the liquid causes the electrical charges present in the water (ions) to undergo an electromagnetic force that pushes them in opposite directions according to their positive or negative charge. Displacement of the electrical charges is present only if the flowrate of water is other than zero, and the degree of displacement of the charges is proportional to the flowrate; i.e., the greater the flowrate of water, the greater the amount of electrical charges that will displace. Displacement of the electrical charges at the sides of the detection area DA creates a potential difference between the electrically conductive bodies 21 of the electrode units 20, which is proportional to the rate of the flow passing through the magnetic field.

The signal across the leads 15 (i.e., the bodies 21) reaches the circuit support 8, where it is processed and/or amplified via the electrical and/or electronic components present on the support. The electrical signal representing the value of flowrate is, for example, transmitted from the support 8 to the control system of the appliance or system served, such as an electrical household appliance, via the wiring 8a or a possible electrical connector of the device 1, for example connected to a wiring of the apparatus or system served.

It should be noted that the modalities of conditioning, processing, and transmission of the data may be implemented according to any known way. For example, preferably, calculation of the value of flowrate on the basis of the potential difference detected via the electrode units 20 and of the parameters known beforehand (size of the section of passage in the detection area DA and magnitude of the magnetic field generated by the arrangement 10) can be carried out by purposely provided componentry present on the circuit support 8 (for example, via a microcontroller) and sent to the aforesaid control system, for example a signal in the form of binary code or a signal variable in voltage and/or frequency. On the other hand, not excluded from the scope of the invention are solutions in which the value of the potential difference, appropriately amplified, is sent directly to the aforesaid control system, where processing of the signal and/or calculation of the flowrate is carried out on the basis of the aforesaid parameters known beforehand.

In various embodiments, the electrical signal read via the electrode units is amplified and converted by an electronic system, comprising, for example, a differential amplifier (or a number of amplifiers used in differential mode) and an A/D converter. The above amplifier (or amplifiers) and A/D converter may, for example, be implemented on the support 8.

In any case, on the basis of the value of flowrate, the control logic is able to measure the amount of liquid that has passed through the device 1, with the system that, for example, will interrupt supply or passage of the liquid when a pre-set amount of water is reached, for example by driving closing of a solenoid valve upstream or downstream of the device 1.

As has been mentioned, in various preferred embodiments, at least the yoke 12 of the electromagnetic arrangement 10 may be made of a semihard material, i.e., a material with high remanent magnetization. Materials of this type enable the magnetic field to persist for a certain length time also when supply to the coil 13 ceases, which is advantageous in view of the reduction of consumption of electric power, in particular when the device 1 envisages an autonomous electric-power source (such as a battery). For example, in various embodiments, the pulses for supply of the coil 13 of the arrangement 10 occur in short time intervals, preferably shorter than one second (for example, 750 ms): use of a semihard material makes it possible to apply such a pulse having a duration of microseconds and guarantee persistence of the magnetic field for the rest of the time required. As may be appreciated, this enables energy saving, which is useful in the case of electrical supply with a battery or the like.

Possibly, using a semihard material at least for the yoke 12, the control electronics of the electromagnetic arrangement 10 may be pre-arranged for supplying the coil 13 in order to generate a first magnetic field, and then interrupt supply in any case guaranteeing persistence of a certain magnetic field for a certain length of time following upon interruption of supply; preferably, but not necessarily, the control electronics may also be pre-arranged for measuring the magnetic field that persists in the aforesaid length of time (for example, via a measurement coil or a Hall-effect sensor), in order to establish decay thereof with the coil 13 not supplied, for example in so as to compensate the measurements of magnetic field and/or to establish when to re-activate supply to the coil 13.

FIGS. 12-16 and 17-21 illustrate further possible embodiments of the invention where, according to an inventive aspect, each electrode unit comprises an electrically conductive body which is made at least in part of elastically compressible material, or at least in part of yielding or deformable material, or in any case a material designed to provide axial and/or radial tightness with respect to the body 2.

In this perspective, for example, in various embodiments, the electrically conductive body of an electrode unit may be made of a relatively stiff conductive plastic and drive-fitted into the corresponding through opening of the hydraulic body, allowing it in any case undergo slight surface deformation in order to adapt to the opening, for example like a plug. In other embodiments, instead, the electrically conductive body of an electrode unit may be made at least in part of an electrically conductive polymer directly moulded on the hydraulic body, in particular at the corresponding through opening.

Also bodies of this sort—which are, for example, made at least in part of an electrically conductive polymer—each have two axial opposite ends, one of which is designed to face the inside of the duct for the liquid, and the other is designed to be in an isolated position with respect to the inside the duct, for connection with a corresponding electrical lead. The sealing means are preferably integrated in each electrode unit and/or may advantageously be provided by the electrically conductive body itself, in particular a body made of elastically compressible material, such as an elastomer, or else made of a material at least in part compliant or deformable in a plastic way, such as a polymer that substantially stiff but in any case able to undergo albeit minimal deformation, for example at the outer surface of the electrode body, or else made of an overmoulded material designed to adhere to the body 2 and/or on the walls of the through opening 31. In various embodiments, such as the ones illustrated in FIGS. 12-16, the electrode units—here designated by 20'—each have a body 21' made of a synthetic material having characteristics of electrical conductivity. This material, at least slightly deformable or compressible, preferably in an elastic way, may for example be an electrically conductive plastic, preferably a thermoplastic polymer or a co-continuous polymer filled with electrically conductive particles, or an electrically conductive elastomer, preferably an elastomer of a silicone type filled with electrically conductive particles.

Preferably, the conductive bodies 21' have a shape that is at least in part cylindrical. In various preferential embodiments, as may be seen for example in FIG. 13, the bodies 21' comprise a substantially cylindrical stem 21c, belonging to which is the axial end 21a, and a head 21d, belonging to which is the axial end 21b. Preferably, the head 21d is a widened head, which defines an annular surface 21e designed to face a corresponding outer surface of the hydraulic body 2 that surrounds the respective through opening 31.

In various embodiments, a widened head 21d of the body 21' is designed to be at least in part axially compressed, via a respective blocking member, when the electrode unit 20' is blocked in the respective working position. Possibly, also the stem 20c may be at least in part in a radially compressed condition or a condition of interference when it is inserted in the corresponding through opening 31.

Figure 13:
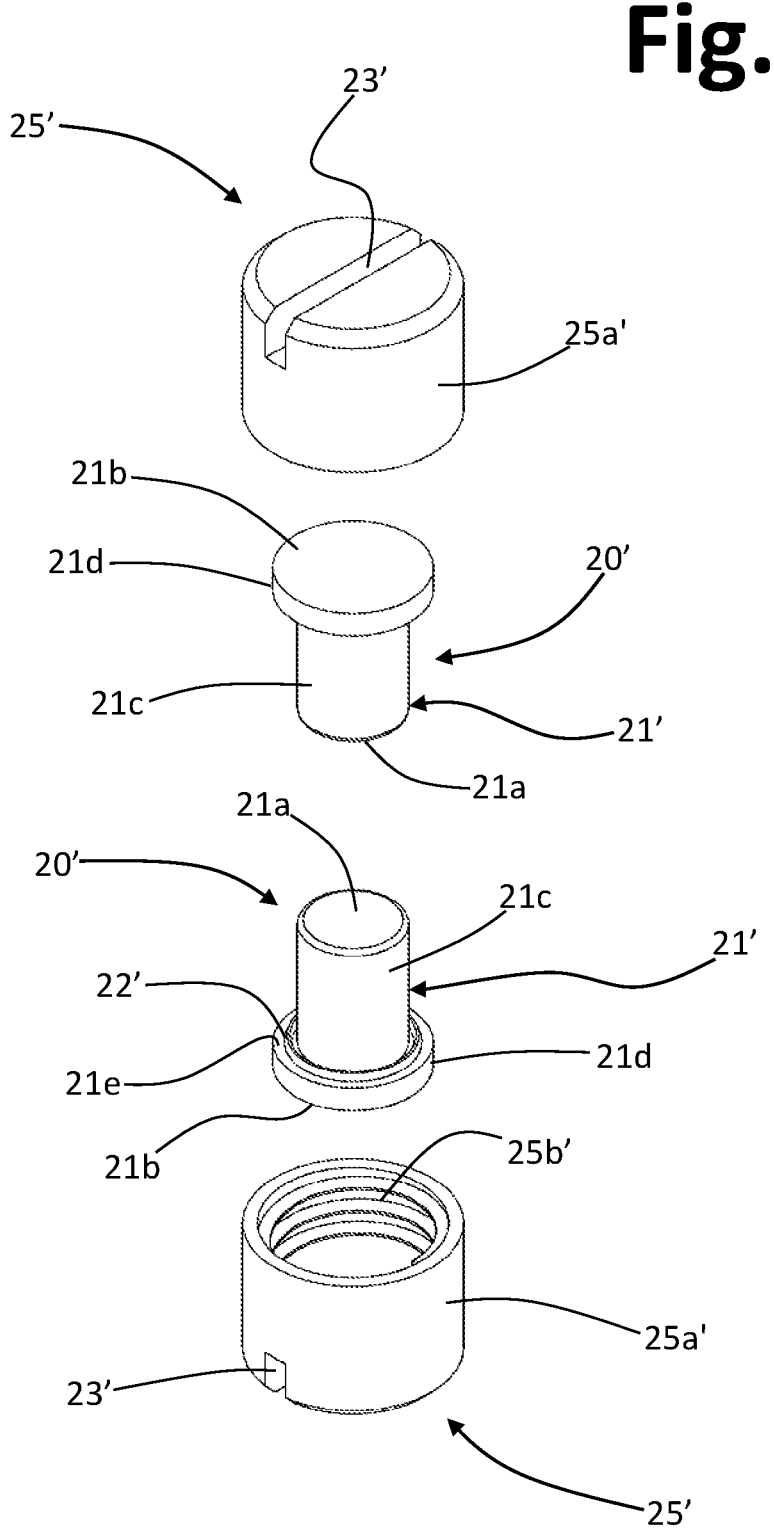
FIG. 13 is a schematic perspective view of two electrode units, with corresponding blocking members, that belong to a detection arrangement of a detection and/or control device according to other possible embodiments of the invention.

In various preferential embodiments, a widened head 21d has associated or defines a sealing element, such as an annular sealing relief of the type designated by 22' in FIG. 13, at its surface 21e that is to face the hydraulic body 2, with the annular relief 22' that preferably provides sealing means integrated in the unit 20'. As will be seen, when the electrode unit 20' is mounted in position, the annular sealing relief 22', which may have, for example, a substantially triangular or in any case pointed profile, is in a respective condition axially compressed between the body 2 and a respective blocking member. Bodies of the type designated by 21', or having a stem and a widened head, may be also formed with an electrical conductive metal material or an electrical conductive metal alloy, in which case the annular sealing relief may also be replaced by a sealing member configured as a distinct part, for example an O-ring type gasket.

Also in embodiments of this type, the detection arrangement comprises blocking members for ensuring positioning of the electrode units 20'. In various embodiments, also these blocking members have a generally cylindrical or tubular shape closed at one end, or in any case distinguished by an inner blind cavity, the dimensions of cross section of which are such as to enable housing of the head 21d of the respective body 21'.

FIG. 13 represents by way of example blocking members 25' shaped like a threaded plug (or cup), with a peripheral wall 25a' that defines at a cylindrical inner surface thereof a female thread 25b'. The blocking members 25' are preferably made of a relatively stiff electrically conductive material (preferably stiffer than the material of the body 21'), for example a metal, such as brass or bronze. Preferably, the blocking members 25' are made of a material designed to be soldered or in any case electrically connected to the lead 15, in particular to its end 15a.

The blocking members 25' themselves may possibly be configured for providing fluid tightness, preferably via a coupling that provides fluid tightness with respect to the body 2, for example via gaskets set in between, such as an annular seal element, or else via respective threads glued or with a sealing material set in between, such as a polytetrafluoroethylene (PTFE) tape.

Figure 14:
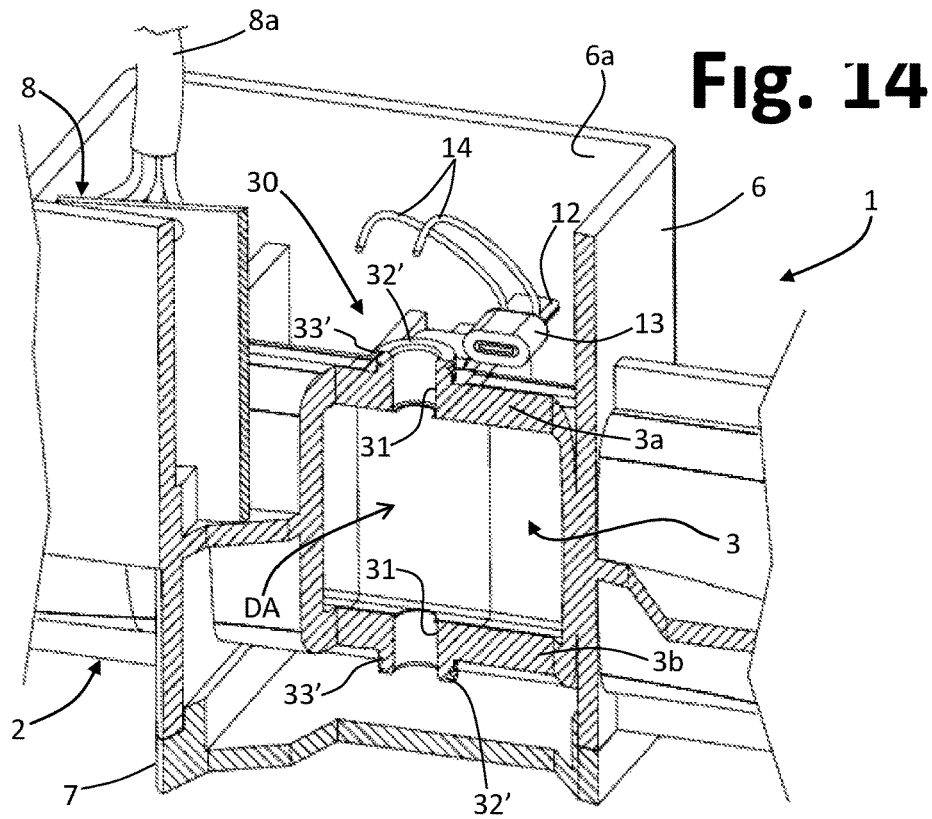
FIGS. 14 and 15 are partial and schematic sectioned perspective views of a portion of a detection and/or control device according to other possible embodiments of the invention, respectively with and without a corresponding detection arrangement.
Figure 15:
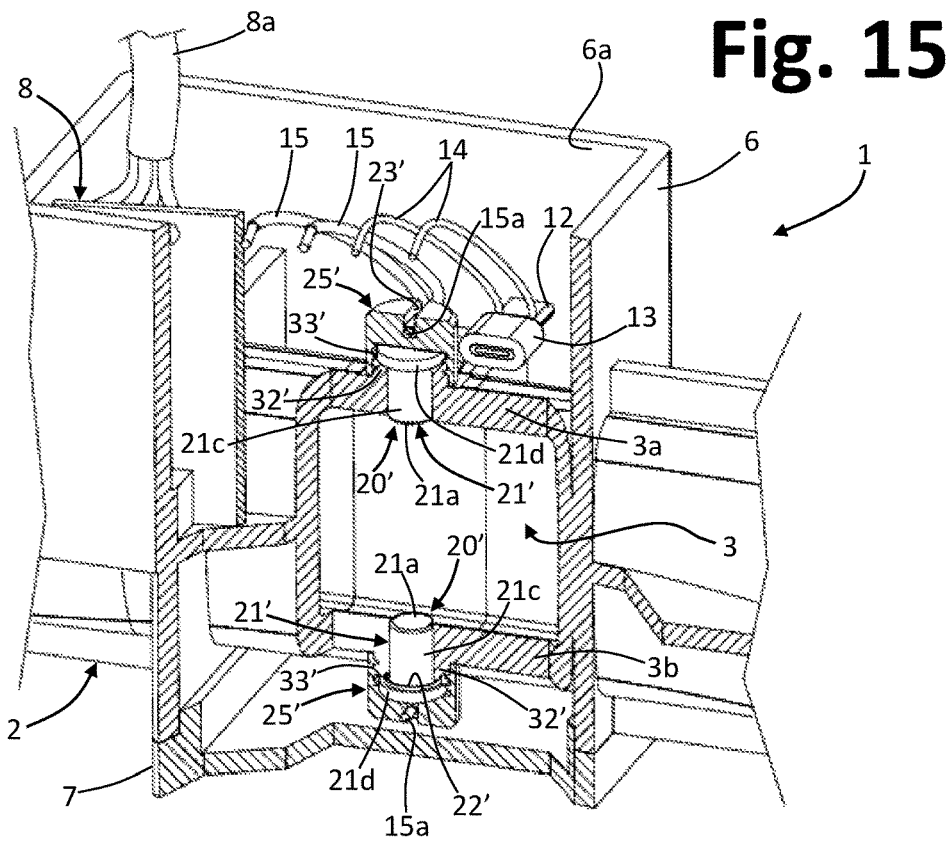

On the other side, as may be seen in particular in FIG. 14, the hydraulic body 2 has, at the outer side of each through opening 31, a respective cylindrical tubular projection 32', which has on its outside a male thread 33', which can engage the female thread 25b' of the respective blocking member 25'.

Advantageously, the blocking member 25' may define a seat at the outer side of its closed end, for coupling of an end of the electrical conductor 15 used for connection of the corresponding electrode unit 20'. In the case exemplified, the blocking member 25' has for this purpose a transverse seat or recess 23', which may be advantageously exploited—during assembly—for receiving the head of a tool (such as a screw-driver or a wrench) used for screwing the blocking member 25' on the corresponding externally threaded tubular projection 32'. After the unit 20' is mounted in position, within the transverse seat 23' there may be inserted the end 15a of the conductor 15, which is then secured in position, for example via soft soldering: this characteristic may, for example, be appreciated from FIG. 15.

For the purposes of assembly, the blocking member 25' could, however, present a profile designed for coupling with some other type of tool, such as a hexagonal profile or a profile with at least two opposite parallel walls; in this configuration, the conductor 15, in particular its end 15a, could be secured or soldered to the transverse seat 23' even prior to the aforesaid assembly.

For the purposes of assembly of the detection arrangement, each electrode unit 20' is coupled in the corresponding through opening 31 of the body 2 (see FIG. 14), in particular by inserting the corresponding cylindrical stem 21c into the opening 31, and with the annular sealing relief 22' carried by the widened head 21d that substantially faces, or rests on, the top surface of the corresponding tubular projection 32'. As has been said, the stem 21c may be inserted into the corresponding opening 31 in a condition of slight compression or radial interference. The electrode body 21' and/or its stem 21c could possibly be glued and/or sealed in a fluid-tight way in the opening 31, for example via a resin, or could be moulded directly in the above opening 31.

At this point, on the cylindrical tubular projection 32' the corresponding blocking member 25' is screwed, tightening it home. The progressive thrust exerted on the head 21d of the conductive body 21' by the member 25' is preferably such as to cause progressive axial compression of the head itself, and in particular a corresponding compression or deformation of the sealing relief 22' on the contrast surface of the hydraulic body 2, which as has been said is here constituted by the top surface of the tubular projection 32'. This deformation of the relief 22' is rendered possible by exploiting the elasticity or the plastic deformability of the material that forms the electrically conductive body 21'. In other embodiments, the thrust exerted by the member 25' makes it possible to obtain the necessary tightness via a relief 22' (i.e., a body 21' that defines it) that is sufficiently rigid as to penetrate at least in part into the contrast surface of the hydraulic body 2, with the latter that is preferably made of a polymer or a plastic material that is substantially stiff, but in any case at least sufficiently yielding as to enable partial copenetration of the aforesaid stiff relief.

After the unit 20' has been assembled, the transverse seat 23' of the member 25' is exploited for connection of the end 15a of the corresponding electrical conductor 15, as already explained above. The fact that the body of the member 25' and the body 21' of the unit 20' are both made of respective electrically conductive materials ensures electrical continuity, in particular via the head 21d of the body 21' in contact with the body of the member 25'.

Also in this case, after assembly of the detection arrangement and of the electromagnetic arrangement 10, the cavity 6a of the portion 6 of the hydraulic body may be closed, for example with the lower lid 7 and the mass of electrically insulating material 9 described previously. Also in this case, an upper lid may possibly be provided, which may comprise an electrical connector, connected to which is the wiring 8.

Figure 16:
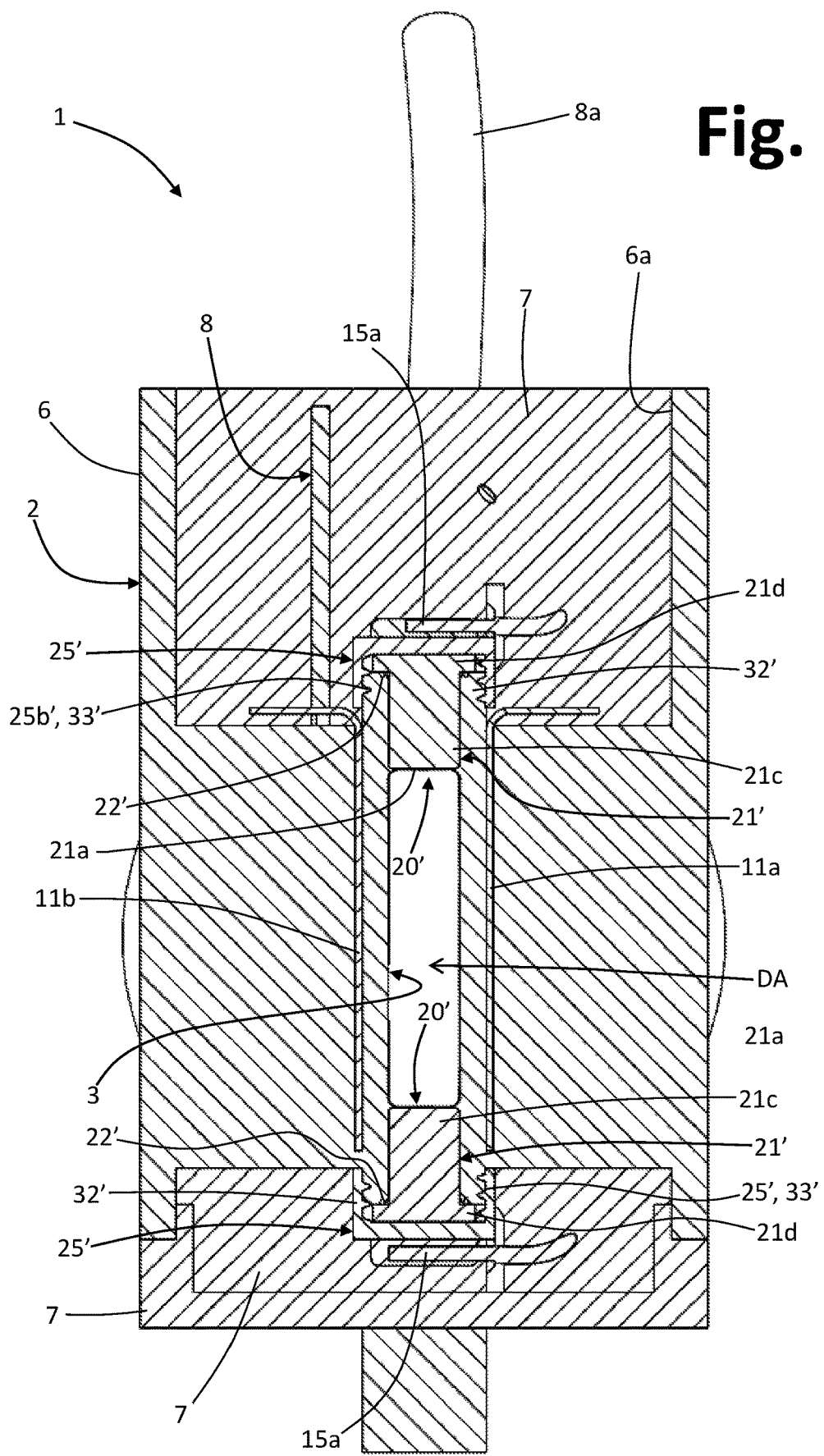
FIG. 16 is a schematic cross-sectional view of a detection and/or control device according to other possible embodiments of the invention.
Figure 17:
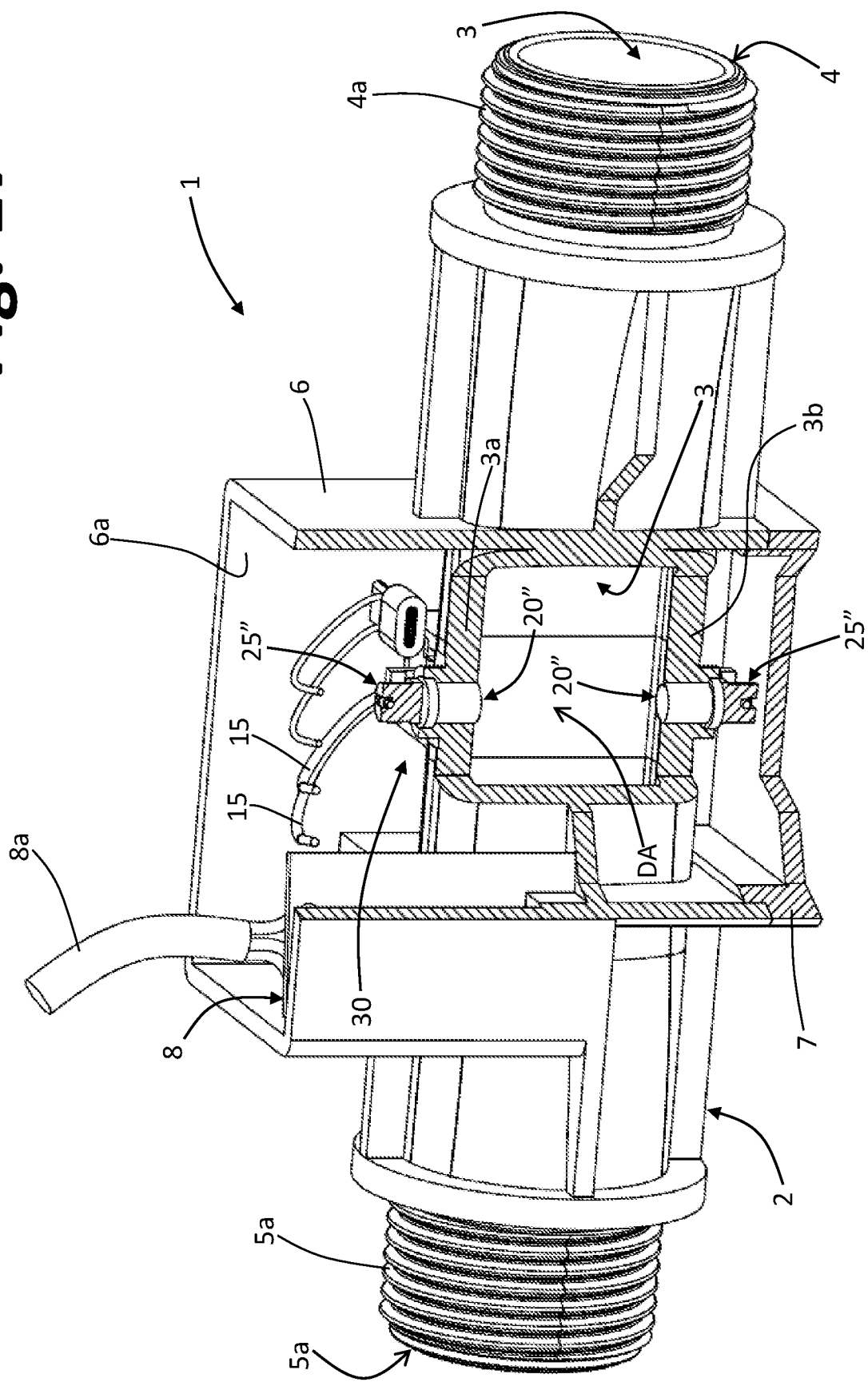
FIG. 17 is a schematic perspective view of a detection and/or control device according to further possible embodiments of the invention.

The device in the assembled condition may be clearly appreciated also from FIG. 16, where in particular it may be noted how the blocking members 25' surround to a major extent the corresponding tubular projections 32', confining on the inside the head 21d of the electrically conductive bodies 21', preferably also determining a further tightness and/or a protection of the electrode 20'. From FIG. 16 there may moreover be appreciated the position of the annular sealing reliefs 22', in the condition where they are compressed or deformed in the axial direction, between the members 25' and the top surface of the tubular projections 32'. Also in this case, in the assembled condition, the electrodes 20' do not substantially protrude in the inside of the duct for the liquid, being them substantially flush with the inner surface of the duct or possibly in a recessed position with respect to said surface.

Also in the case of the embodiments shown in FIGS. 17-21, electrode units 20" are provided having a respective body 21" preferably made at least in part of an electrically conductive polymeric material.

As may be appreciated, in particular, from FIG. 18, also in this case the body 21" has a stem 21c designed for insertion into a respective through opening 31 of the hydraulic body (see FIG. 19) and a head 22" designed to remain on the outside of the opening 31. The head 22" preferably has a widened shape, with the respective annular surface 21e facing a corresponding outer surface of the hydraulic body 2.

In the case illustrated, the deformable or stiff sealing relief 22' of the embodiments described with reference to FIGS. 12-16 is not envisaged, but it could in any case be provided. In general, in the case of the embodiments of FIGS. 17-21, the body 21" may be made of an electrically conductive elastomer, and hence present good characteristics of elastic flexibility so that the function of tightness proper of the unit 20' can be obtained directly by a widened head 22", which, when the unit is in the installed condition, is in an axially compressed condition, as described hereinafter. Alternatively, the unit 20' and/or the widened head 22" could be made of a relatively stiff electrically conductive material and tightness be provided by a sealing element, such as an annular gasket or an O-ring, set between the unit 20' and/or widened head 22" and the body 2. Of course, as for some cases described previously, the stem 21c can be inserted into the opening 31 in a condition of at least partial compression or interference or radial tightness with respect to the body 2.

In various embodiments, the blocking member and the corresponding engagement seat are configured for co-operating together following upon a relative angular movement, in particular with a coupling of a substantially bayonet type.

With reference in particular to FIG. 18, in this case also the blocking members 25" have a respective body made of a relatively stiff electrically conductive material (preferably stiffer than the material of the body 21"), for example a metal, such as brass or bronze.

The body of the member 25" has a stem 25a", preferably provided at one end with a transverse seat 23", similar to the one previously designated by 23', as well as a flange 25b" at the other end. The peripheral profile of the flange 25b" includes two parallel chamfers or flattened portions 25d.

Figure 19:
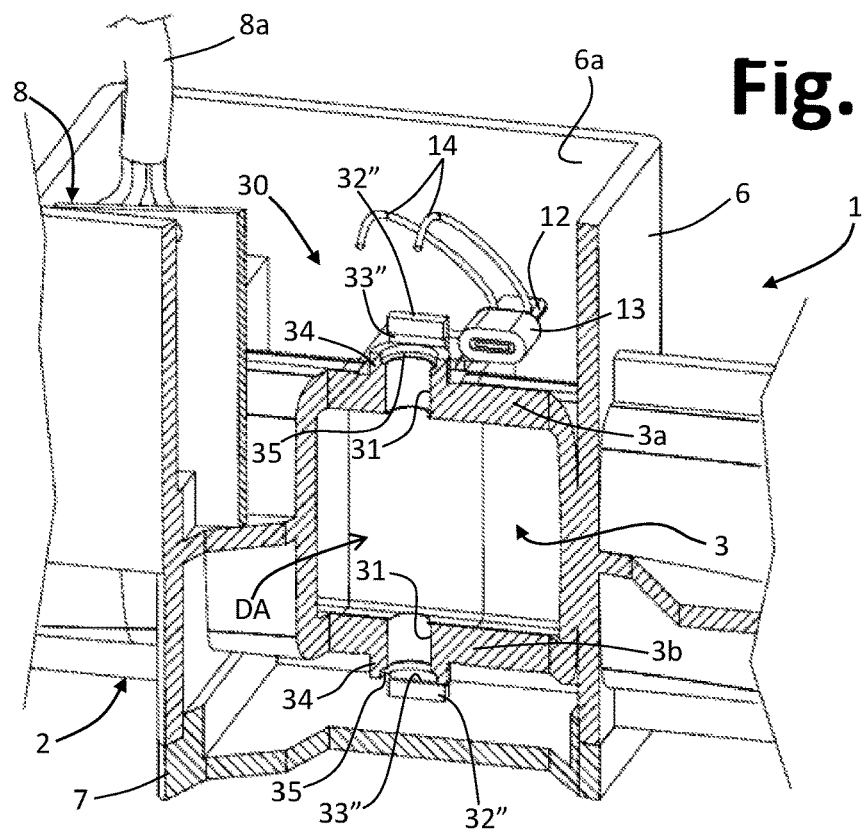
FIGS. 19 and 20 are partial and schematic sectioned perspective views of a portion of a detection and/or control device according to further possible embodiments of the invention, respectively with and without a corresponding detection arrangement.
Figure 20:
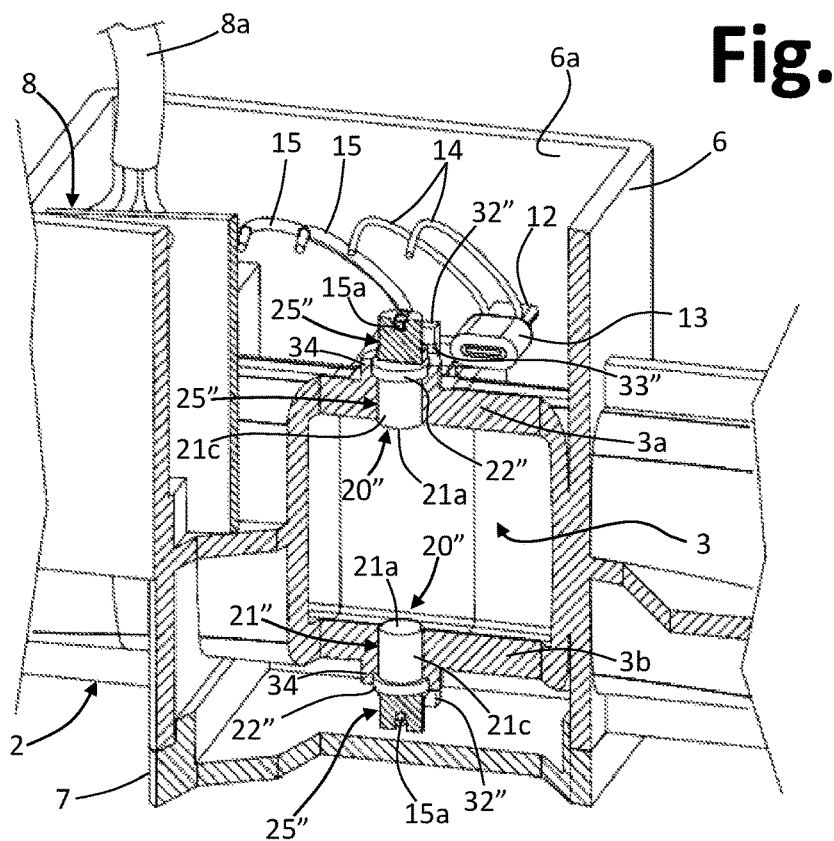

On the other side, as may be seen in particular in FIG. 19, at each opening 31, the body 2 has a tubular projection 34 preferably substantially cylindrical, which defines at its top a seat 35 designed to receive at least partially the head 22" of a corresponding conductive body 21". Rising at two opposite sides of the projection 34 are also two substantially parallel reliefs 32" (only one of which is visible), which define respective transverse recesses or grooves 33" facing one another.

For the purposes of assembly of the units 20", the bodies 21", i.e., the corresponding stems 21c, are each inserted into the corresponding through opening 31, until the corresponding widened head 22" positions itself at least in part within the seat 35 defined at the top of the corresponding tubular projection 34 (see FIG. 19). The reliefs 32" are opposed to one another and sized, in terms of height and distance, so as to be able to receive between them, in the axial direction, the respective blocking member 25", but only when the later has an angular orientation such that its two flattened portions 25d (FIG. 18) are substantially parallel each to the front of the respective relief 32". Hence, in this way, the member 25" can be pushed on the widened head 22" of the body 21", causing an at least partial axial compression thereof within the corresponding seat 35, until the flange 25b" of the member 25" (i.e., the corresponding parallel flattened portions 25d) comes at the recesses 33" of the parallel reliefs 32". At this point, by causing angular movement of the bodies 25" about their axis (for example, using a suitable tool that can be engaged in the transverse seat 23"), the opposite sides not chamfered of the flange 25b" (substantially orthogonal to the flattened portions 25d) may be brought up to engage in the recesses 33", thereby blocking the bodies 21", preferably with the corresponding heads 22" in an axially compressed condition, substantially between the top of the tubular projections 34 and the member 25", thereby ensuring good characteristics of tightness.

Also in this case, the transverse seat 23" of the members 25" can be exploited for coupling the end 15a of the corresponding lead 15, it being possible for this end to be secured in position, for example via soft soldering. Alternatively, the members 25" could be shaped so as to provide an electrical connector, for example of a male type, designed to couple with a respective connector provided on the end 15a of the lead 15, for example in the form of a female connector.

FIGS. 17-21 moreover illustrate how, in various embodiments, the blocking members may each comprise an axially projecting coupling element, designed to be engaged in a condition of electrical contact into a corresponding axial blind seat of the electrically conductive body of the respective electrode unit. An opposite arrangement is also possible, i.e., with an axial coupling element on the electrically conductive body and a corresponding axial seat on the blocking member.

With reference in particular to FIG. 18 it may be noted how the bodies 21" present, at their axial ends 21b, a central seat or blind hole 23, in which an axial pin 25e that projects from the corresponding end of the blocking member 25" is to be inserted. For this purpose, the pin 25e is preferably pointed, and insertion occurs with a certain interference, preferably an elastic interference, in particular in the case of a body 21" made of elastic material. As has been said, the body of the members 25" is electrically conductive, with their head end that, in the installed condition, is pressed on the head 22" of the corresponding electrically conductive bodies 21", in particular in an elastically compressed condition: this ensures in itself a good electrical contact, but coupling between the pins 25e and the corresponding holes 23 improves contact, in addition to contributing to axial positioning proper between the parts in question. The assembled condition may be clearly appreciated from FIGS. 20 and 21. As has been said, a pin functionally similar to the one designated by 25e could be provided in the body 21", and a corresponding seat functionally similar to the one designated by 23 could be provided in the body of the member 25".

Also in this case, after assembly of the detection arrangement and of the electromagnetic arrangement 10, the cavity 6a of the portion 6 of the hydraulic body can be closed, for example with the lower lid 7 and the mass of electrically insulating material 9 described previously. Also in this case, an upper lid may possibly be provided, possibly comprising an electrical connector connected to which is the wiring 8.

According to an inventive aspect, in particular when the electrode units comprise respective bodies made at least in part of an electrically conductive polymeric material, it is advantageous for the bodies to include a filler of a material having an inhibiting effect on proliferation of micro-organisms. Such a material, preferably silver, may be exploited to render electrically conductive the material in question, or else may be a filler additional to another conductive filler, for example particles of another metal or of carbon black (CB). Preferentially used for this purpose are silver flakes, having lateral dimensions ranging between 500 nm to 20 μm, preferably ranging between 1 and 5 μm; the thickness may, instead, be comprised between 50 nm and 2 μm, preferably between 100 nm and 500 nm.

Use of a filler with inhibiting effect on proliferation of micro-organisms is particularly advantageous for the purpose of countering formation of biofilm on the surface of the electrode units exposed to the liquid, which could cause drifts in the measurement made by the flow sensor. The addition of silver flakes, which have a flattened and wide shape with a high aspect ratio, can hence prove useful both as electrically conductive filler, in combination with other conductive particles, and for bestowing a biostatic or bio-inhibiting effect on the surface of the electrode units exposed to the liquid.

In general terms, according to an aspect of the invention, it is possible to use electrically conductive bodies—for example, of the same type as those previously designated by 21' and 21"—made of polymeric-based composites, with one or more electrically conductive fillers different in shape and concentrations according to the desired level of electrical conductivity. The conductive particles within the insulating polymeric matrix thus form a lattice of preferential paths for the electric current.

In this regard, it is to be highlighted how the electrodes used in electromagnetic-induction flow sensors according to the known art are frequently affected by problems linked to the difficulty of having an electrical signal free from disturbance. These problems are basically due to the nature of the material itself of the electrode and are principally described below.

The electrodes constituted by metals have by their very nature an electrochemical potential (they generate a voltage) when they are set in contact with another metal and/or when they are in contact with an electrically conductive liquid. This is true also when two electrodes immersed, for example, in water are constituted by one and the same material. Minor surface differences between the metal electrodes or a variation in time thereof (due, for example, to oxidation or wear) result in a voltage when the electrodes themselves are set in contact with one another with an electrical measurement circuit. The problem is that this disturbance voltage is of an amplitude equal to or greater than that of the signal that is to be measured.

Another problem is represented by the fact that, when the electrodes are in contact with an electrically conductive liquid, as is water, conduction of the electrical charges occurs by surface exchange. Basically, the electrical charges of the water (ions) must "strike" the surface of the electrically conductive material and "set in motion" the electrons thereof. The capacity of a material to conduct electricity in this situation is linked to a typical characteristic of the material itself referred to as "noise energy". This type of electrical noise adds to the other better known types of electrical noise (induced noise, conducted noise) and is typical of electrodes set in contact with electrically conductive liquids. The electrical charges of water cause the electrodes to perform a random movement that, seen in terms of frequency analysis, has a spectrum of a white-noise type (all the frequencies are present with a random distribution). Owing to its very nature, the material responds to the electrical stresses, not transferring them perfectly, but distorting them. The type of electrical noise linked to noise energy is also known as "flicker noise" and has a 1/f power spectral density; i.e., it is typically higher at low frequencies, whereas it is negligible at high frequencies.

In practice, electrodes in contact with an electrically conductive liquid transmit an electrical signal as if they were an impedance not constant in frequency, i.e., with an ohmic value and phase variable with the frequency of the signal to be transmitted.

In addition to the foregoing, it is necessary to take into account the fact that the electrical signal read by the electrodes must then be amplified and converted by an electronic system, constituted, for example, by a differential amplifier (or a number of amplifiers used in differential mode) and by an A/D converter. Both of these components have a non-constant frequency spectrum (transfer function) so that a signal already distorted in frequency at the origin (by the electrodes) will be further worsened in the signal-conditioning chain.

In the specific case of an electromagnetic-induction flow sensor, the electrical behaviour at low frequencies is important, in so far as both the stresses of the coil that are to generate the magnetic field (such as the coil 13) and the measurements of the signal are carried out at low frequency.

For this reason, it is advantageous to use non-metal electrodes, i.e., ones that are without electrochemical potential and have a stable behaviour at low frequencies (low noise energy and impedance constant in frequency).

Use of electrically conductive bodies with polymeric base provided according to an aspect of the invention combine the advantages of a carbon electrode with the ease of production and integration within the measurement device.

In various embodiments, to obtain high conductivity with a relatively lower concentration of conductive filler, it is possible to use particles with high aspect ratio, which are advantageous as compared to spheroidal particles. In this perspective, in various preferential embodiments, it is possible to use as conductive filler carbon nanotubes or other conductive particles having a high aspect ratio, such as graphene (and/or the silver flakes mentioned previously), with which it is possible to obtain the necessary electrical conduction also with a relatively low amounts of fillers, roughly between 2% and 5% of the weight of the composite.

In various preferential embodiments, the composite used has a matrix formed by at least one elastomer or a polymer filled with electrically conductive particles, for example graphite fibres with or without further addition of particles of graphene or carbon black (or silver). High conductivity may be obtained also in this case using carbon nanotubes or other particles with high aspect ratio.

Even though it is possible to use both natural and synthetic rubbers of various kinds, it may be particularly advantageous to use elastomers of a silicone type, suited for applications in the food sector. For instance, silicone may be filled with multilayer graphene particles having lateral dimensions of between 2 µm and 15 µm, preferably between 5 µm and 10 µm. Preferentially, in the case where graphene is used, its weight percentage is higher than 2%, preferably between 5% and 15% of the total weight of conductive composite. The electrical conductivity may also be increased by mixing graphite fibres and graphene particles. It is also possible to use carbon black at a concentration higher than 10 wt %, preferably higher than 15 wt %. Combination of graphite and metal fibres in a silicone matrix in which a micrometric conductive filler is present in a concentration higher than the percolation threshold may be particularly convenient to obtaining high levels of conductivity.

In various embodiments, the bodies of the electrode units made at least in part of an electrically conductive composite material may also have a thermoplastic base and may advantageously present a certain elasticity that enables radial and/or axial compression thereof. In the case of a composite the matrix of which is obtained using just one thermoplastic polymer (i.e., a single phase), it is preferable to envisage relatively high concentrations of electrically conductive filler, for example higher than 20% in weight of carbon black. Also in the case of a thermoplastic matrix, it is in any case possible to use fillers with high aspect ratio of the type mentioned above.

According to the invention, it is also possible to use mixtures of co-continuous polymers, in which the conductive filler is segregated preferably in an area of the composite, thus increasing the local concentration and hence lowering the percolation threshold. Possible composites that can be used in the application proposed herein are indicated in the table below.

TABLE 1

| Co-Continuous Composites (carbon-black filler) | | |
|---|---|---|
| Polymeric System | | Filler Distribution |
| PP | EVA | Distributed |
| PP | EAA | Distributed |
| HDPE | EEA | EEA |
| PP | EOC | EOC |
| HDPE | EVA | EVA |
| HDPE | PP | HDPE |
| HDPE | PS | HDPE |
| PP | HDPE | HDPE |
| iPP | HDPE | HDPE |
| HIPS | SIS | HIPS |
| PMMA | PP | Interface |
| HDPE | PMMA | Interface |
| PAN | PA6 | Interface |
| PP | PPMA | Interface |
| LDPE | PP | LDPE |
| LDPE | EVA | LDPE |
| LLDPE | EMA | LLDPE |
| LLDPE | NBR | NBR |
| PP | Novolac | Novolac |
| ABS | PA6 | PA6 |
| PA6 | PS | PA6 |
| PAN | PA6 | PA6 |
| PVDF | PA6 | PA6 |
| ABS | PA6 | PA6 |
| PMMA | PA6 | PA6 |
| PP | PA6 | PA6 |
| ABS | PC | PC |
| PVDF | PC | PC |

TABLE 1-continued

Co-Continuous Composites (carbon-black filler)

| Polymeric System | | Filler Distribution |
| --- | --- | --- |
| PLA | PCL | PCL |
| PET | HDPE | PET |
| PLA | PPC | PPC |
| PP | PS | PS |

In the above materials, according to the choice of the polymers used for the matrix, different distributions of the conductive filler are obtained. In some composites—as in the case of the mixture formed by polypropylene and ethylene vinyl acetate (PP-EVA) or else polypropylene and ethylene acrylic acid (PP-EAA)—a homogeneous distribution of the conductive filler in the entire matrix (i.e., in the two polymers that make it up) is obtained, whereas in other composites the conductive filler is segregated or confined within just one of the two materials of the matrix, as in the case of the mixture formed by polypropylene and high-density polyethylene (PP-HDPE), where the conductive filler concentrates within the HDPE alone.

In various preferential embodiments, use of a mixture constituted by high-density polyethylene and polyoxymethylene (HDPE-POM) is envisaged, where the conductive filler is added to the high-density polyethylene and substantially confined therein.

In other composites still, the electrically conductive filler is substantially concentrated at the interface between the two polymers of the matrix, as in the case of the mixture formed by high-density polyethylene and polymethylmethacrylate (HDPE-PMMA). Concentration of the conductive filler at the interface makes it possible to obtain very conductive composites also at relatively low concentrations.

The choice of the material for the electrically conductive bodies of the electrode units may hence be made out of various combinations of polymers, preferably choosing those that confine the conductive filler in a part of the composite over the combinations that give rise to a homogeneous distribution.

Advantageously, the electrically conductive composite chosen for the electrode unit or the corresponding electrically conductive body may be compatible with the material of which the duct for the liquid of the hydraulic body, in particular of the area that houses the electrode units, is made. Preferably, the material chosen for the electrode unit or the corresponding electrically conductive body is designed to fix or bind chemically or structurally to the material of the duct or of the hydraulic body.

If, for example, the body 2 is made of polypropylene (PP), it may be advantageous to use for the conductive bodies of the electrode units a mixture that contains polypropylene or a material that is able to bind chemically and/or structurally to the polypropylene, or that exclusively has a base of polypropylene with a high amount of conductive filler, for example carbon black. Very advantageously, in embodiments of this type, it will be also possible to weld with hot-blade welding, or vibration welding, or laser welding, or with any known technique (or else mould or overmould) the electrically conductive body of the electrode unit at the corresponding through opening, to obtaining a particularly reliable fluid tightness.

Also in the case of electrically conductive composites with thermoplastic-polymer-based matrix, it is preferable to add the composite with particles with inhibiting effect on proliferation of micro-organisms, for the reasons already mentioned above.

In the case where a single polymer is used, for example, polypropylene (PP) or polyethylene (PE), it is possible to add the conductive filler (for example, carbon black and/or graphene particles and/or graphite fibres and/or silver flakes) to the entire mass of the polymer, or else use master batches separately added to which is a different type of filler. It may also be advantageous to add different master batches with each filler and then mix them so as to maintain the polymer sufficiently fluid during extrusion.

In the case of immiscible co-continuous polymers, it will be possible to add all the fillers in a single master batch or else add the various fillers in different stages.

For example, in the case of a mixture of polypropylene and (low-density or high-density) polyethylene, it will be possible to provide two master batches of polyethylene (PE), a first master batch (MB1) containing carbon black (or some other carbon filler) in a weight concentration of between 15% and 60%, preferably between 25% and 40%, and a second master batch (MB2) containing silver flakes in a weight concentration comprised between 5% and 40%, preferably between 20% and 30%. The second master batch (MB2) may also contain a percentage of carbon black, or other carbon filler, so as to contribute more to electrical conduction of the composite and set the silver flakes in contact. As has been said, the silver flakes preferably have lateral dimensions ranging between 500 nm to 20 µm, preferably between 1 µm and 5 µm; the thickness is, instead, comprised between 50 nm and 2 µm, preferably between 100 nm and 500 nm. The two master batches of polyethylene (PE) can then be mixed with the polypropylene (PP) in order to obtain the final composite.

From the electrical standpoint, the composite materials mentioned are advantageous in so far as they present a limited variation in the values of magnitude of the impedance and phase. In particular, with the materials mentioned it is possible to obtain a variation of the magnitude of the impedance of less than 20% in the frequency range between 1 and 100 Hz, and a variation of the phase of less than 1° in the frequency range between 1 and 100 Hz.

The composites considered hence have relatively stable values of magnitude of the impedance and phase, and this is particularly advantageous for the application proposed, with a stable behaviour at low frequencies. The conductive part of the composite consists of carbon and does not present the problems highlighted previously for metal electrodes. The fact that the conductive body of the electrode unit is made of a material with polymeric base makes it possible to produce conveniently the body itself in the most appropriate form, for example via injection moulding, in a much easier way also as compared to traditional graphite or carbon electrodes, moreover facilitating subsequent assembly of the electrode units in the measurement duct, for example by welding or according to the other modalities mentioned previously.

The device according to the invention may be conceived for measurement of flowrate alone, as in the examples of embodiment illustrated, for instance, for dosed delivery of liquid to a corresponding appliance or system, where the dosage is carried out on the basis of a detection of flowrate made by the flow sensor. In other embodiments, the device described may comprise further functional elements, such as an electric valve, including an open/close element that can be controlled as a function of detections made by the flow meter, in order to open and/or close the duct internal to the hydraulic body. The aforesaid electric valve may also be located in a remote position with respect to the hydraulic body, but in any case can be controlled as a function of detections made via the flow sensor (for example, a control device the hydraulic body of which provided with the flow sensor is mounted upstream of a pipe for supply of water to an appliance, provided downstream of which is instead a solenoid valve, with the detections made by the flow sensor that are used for controlling the solenoid valve).

The invention described may also be implemented in an anti-flooding safety device, i.e., a device pre-arranged for preventing possible liquid leaking from a supply pipe from spreading into the surrounding environment, thus causing flooding. For example, in such a safety device, a pipe for supply of the liquid extends longitudinally at least in part within an outer pipe, which is also impermeable to the liquid, in such a way that a gap is defined between at least part of the two pipes, which is designed to collect the possible leakage liquid or to convey it to a corresponding leakage sensor, and where an electric valve upstream or downstream of the inner pipe (for example, integrated in the hydraulic body of the device) can be controlled to interrupt the flow of liquid in the case where leakage of the liquid is detected. Integration of a flow sensor as described previously in such an anti-flooding safety device may be useful for managing operation of the device itself (as has been said, in the case of detection of a leakage) or of the appliance or system served (for example, for calculating the amount of liquid charged into the appliance or system).

It is clear that numerous variations may be made by the person skilled in the branch to the hydraulic detection and/or control device described by way of example, without thereby departing from the scope of the invention as defined by the ensuing claims.

In various embodiments, the hydraulic detection and/or control device according to the invention may be provided with an autonomous source for electrical supply of its own circuit arrangement, for example via at least one battery, in particular for supplying at least the part of the circuit arrangement corresponding to the flow sensor. In this way, autonomous operation of the device may be possible even in the absence of supply from the electric-power mains or with the liquid-conducting household appliance turned off. The one or more batteries that provide the internal supply source of the device are preferably rechargeable batteries, which can be charged from the electric-power mains directly or via the appliance or system served. Even in the presence of one or more batteries, the circuitry implemented in the device, in particular on its circuit support 8, may be pre-arranged for being supplied also from the power mains, as well as for detecting the possible absence of the mains voltage, and in this case enable supply via the battery or batteries. On the other hand, given that the consumption of electric power determined by the circuit arrangement internal to the device is very low (basically limited to the consumption necessary for generation of the magnetic field via the arrangement 10), this circuit arrangement could be even always supplied by means of an internal supply source of its own.

Individual characteristics disclosed with reference to embodiments described previously may be combined together in other embodiments. For example, it will be appreciated that blocking members with a substantially bayonet coupling, i.e., having a coupling principle similar to that of the members previously designated by 25", might be made with an electrically insulating material, with the electrical conductors or leads of the corresponding electrode units connected directly to the respective electrically conductive bodies, for example by exploiting a passage defined in the same blocking member, through which a pin of the conductive body protrudes, to said pin there being associated the corresponding electrical conductor. Blocking member with a substantially bayonet-type coupling might also be used in conjunction with electrode units having an electrically conductive body made of metal or metal alloy, for example having a shape of the type shown in FIGS. 5-6 or in FIG. 13 or, as said, provided with a pin passing through a corresponding passage of the respective blocking member, for the purpose of connection to the respective electrical conductor. Moreover, as already indicated, a blocking member with a substantially bayonet coupling might be formed integrally, i.e., in a single piece, with the electrically conductive body of the respective electrode unit, in particular when said body is made of an electrically conductive metal or metal alloy.

The invention claimed is:

1. A detection device for a liquid-conducting appliance or system, the device comprising:
   a hydraulic body defining a duct for a flow of a liquid, the duct having an inlet and an outlet, the hydraulic body being made of an electrically insulating material;
   a flow sensor located at least in part on the hydraulic body, which comprises:
      an electromagnetic arrangement, configured for generating an electromagnetic field through the duct, in a direction transverse to the flow of the liquid, the electromagnetic arrangement having a U-shaped configuration including two magnetic poles made of ferromagnetic material, which are generally parallel and symmetrical, and are connected together by means of a core, which is also made of ferromagnetic material, arranged on which is an electrical coil,
      a detection arrangement, which comprises at least two electrode units for detecting a potential difference induced by the flow of the liquid through the electromagnetic field, the at least two electrode units being arranged to be in contact with the liquid in a respective working position, each electrode unit being in a single piece made of an electrically conductive material and defining a widened portion,
   wherein the hydraulic body has at least two through openings at two opposite first sides of the duct, at least partially inserted in each of which is a corresponding electrode unit, in such a way that, in the respective working positions, the electrode units are substantially aligned or opposed to one another,
   wherein the poles of the electromagnetic arrangement are located on the outside of the duct, at two second sides of the duct opposite to one another and orthogonal to the first sides,
   the device further comprising sealing means at each through opening, configured for preventing leakage of the liquid from the duct through the corresponding through opening,
   wherein each electrode unit is inserted into the respective through opening from outside the duct, such that the respective widened portion remain on the outside of the duct,
   wherein the sealing means are associated to, or integrated in, a respective electrode unit in such a way that said sealing means of an electrode unit can be positioned with respect to one said through opening, outside the duct, by means of a movement in the same direction of insertion from outside the duct of the respective electrode unit into the corresponding through opening, wherein the detection arrangement further comprises at least one blocking member, outside the duct and in contact with the sealing means which is associated to, or integrated in, the corresponding electrode unit, the at least one blocking member being made of electrically insulating material and configured for co-operating mechanically with the hydraulic body and with a respective electrode unit in order to prevent said respective electrode unit from slipping out of the corresponding through opening, wherein the electrically insulating material of hydraulic body integrally defines, outside the duct and in a position corresponding to one said through opening, at least one engagement seat for the at least one blocking member, wherein the hydraulic body moreover defines outside the duct, at each of the second sides, a mounting slit inside which part of a respective magnetic pole of the magnetic arrangement is inserted, and wherein the at least one blocking member has at least one coupling portion configured for coupling in the at least one engagement seat via an angular movement of the at least one blocking member.

2. The device according to claim 1, wherein the at least one engagement seat for the at least one blocking member comprises two opposed recesses, in which corresponding opposed portions of the blocking member are engageable following upon partial rotation of the blocking member about an axis thereof.

3. The device according to claim 2, wherein the at least one engagement seat for the at least one blocking member comprises a tubular projection, defined by the electrically insulating material of the hydraulic body in a position corresponding to said respective through opening, the tubular projection having a top outside the duct, wherein rising at two opposite sides of the top of the tubular projection are two opposite reliefs which defines said two opposed recesses, engageable in which are said corresponding opposed portions of the blocking member.

4. The device according to claim 1, wherein the electrode unit comprises:

an electrically conductive body made at least in part of a stiff material, having a first axial end and a second axial end, the first axial end facing the inside of the duct, the second axial end defining said widened portion and being in a position isolated with respect to the inside of the duct for connection to an electrical conductor, and at least one sealing element made of deformable or elastically compressible material, which provides said sealing means and is mounted or moulded on the electrically conductive body in an intermediate position between the two axial ends, the at least one sealing element being in a radially compressed or deformed condition within the corresponding through opening.

5. The device according to claim 4, wherein the electrically conductive body comprises said widened portion, that defines or has associated said at least one sealing element at a surface thereof facing a corresponding outer surface of the hydraulic body that surrounds one said through opening, the at least one sealing element being in a respective operating position when the electrode unit is blocked in the respective working position by said at least one blocking member.

6. The device according to claim 4, wherein the second axial end of the electrically conductive body defines a connection seat for an end of said electrical lead.

7. The device according to claim 1, wherein the electrically conductive body includes a filler of at least one material having inhibiting effect on proliferation of microorganisms.

8. A liquid-conducting appliance or system, comprising the detection device according to claim 1.

9. A detection device for a liquid-conducting appliance or system, the device comprising:

a hydraulic body defining a duct for a flow of a liquid, the duct having an inlet and an outlet, the hydraulic body being made of an electrically insulating material;

a flow sensor located at least in part on the hydraulic body, which comprises:

an electromagnetic arrangement, configured for generating an electromagnetic field through said part of the duct, in a direction transverse to the flow of the liquid, the electromagnetic arrangement having a U-shaped configuration, which comprises two magnetic poles made of ferromagnetic material, which are generally parallel and symmetrical, and are connected together by means of a core, which is also made of ferromagnetic material, arranged on which is an electrical coil, a detection arrangement, which comprises at least two electrode units for detecting a potential difference induced by the flow of the liquid through the electromagnetic field, the at least two electrode units being arranged for being in contact with the liquid in a respective working position, each electrode unit being in a single piece made of an electrically conductive material and defining a widened portion, wherein the hydraulic body has at least two through openings at two opposite first sides of the duct, at least partially inserted in each of which is a corresponding electrode unit, in such a way that, in the respective working positions, the electrode units are substantially aligned or opposed to one another, wherein the poles of the electromagnetic arrangement are located on the outside of the duct, at two second sides of the duct opposite to one another and orthogonal to the first sides, wherein a sealing ring is provided at each through opening, outside the duct, configured for preventing leakage of the liquid from the duct through the corresponding through opening, wherein the detection arrangement further comprises at least one blocking member made of an electrically insulating material, on the outside of the duct, configured for co-operating mechanically with the hydraulic body and with a respective electrode unit in order to fix the respective electrode unit in position, wherein the hydraulic body has, on the outside of the duct and in a position corresponding to one said through opening, engagement means for the at least one blocking member, wherein the hydraulic body moreover defines outside the duct, at each of the second sides, a mounting slit for a respective magnetic pole of the magnetic arrangement, wherein the engagement means comprise at least one engagement seat for the at least one blocking member, which is integrally defined by the electrical insulating material of the hydraulic body, outside the duct and in a position corresponding to one said through opening, wherein the blocking member has at least one coupling portion configured for coupling in the at least one engagement seat via an angular movement, wherein the at least one engagement seat has two opposed constraint recesses, and the blocking member has two opposed coupling portions, each coupling portion being engageable in a respective constraint recess following upon a partial rotation of the blocking member about an axis thereof, to thereby fix in position the corresponding electrode unit and keep the corresponding sealing ring in an elastically compressed condition, and wherein the hydraulic body moreover defines outside the duct, at each of the second sides, a mounting slit inside which part of a respective magnetic pole of the magnetic arrangement is inserted, to keep the corresponding magnetic pole in a working position thereof.

10. A detection device for a liquid-conducting appliance or system, the device comprising:

a hydraulic body defining a duct for a flow of a liquid, the duct having an inlet and an outlet, the hydraulic body being made of an electrically insulating material;

a flow sensor located at least in part on the hydraulic body, which comprises:

an electromagnetic arrangement, configured for generating an electromagnetic field through said part of the duct, in a direction transverse to the flow of the liquid, the electromagnetic arrangement having a U-shaped configuration: which comprises two magnetic poles made of ferromagnetic material, which are generally parallel and symmetrical, and are connected together by means of a core, which is also made of ferromagnetic material, arranged on which is an electrical coil, and a detection arrangement, which comprises at least two electrode units for detecting a potential difference induced by the flow of the liquid through the electromagnetic field, the at least two electrode units being arranged for being in contact with the liquid in a respective working position, each electrode unit being in a single piece made of an electrically conductive material and defining a widened portion, wherein the hydraulic body has at least two through openings at two opposite first sides of the duct, at least partially inserted in each of which is a corresponding electrode unit, in such a way that, in the respective working positions, the electrode units are substantially aligned or opposed to one another in a direction transverse to the flow of the liquid and to the magnetic field, wherein the poles of the electromagnetic arrangement are located on the outside of the duct, at two second sides of the duct opposite to one another and orthogonal to the first sides, wherein a sealing ring is provided at each through opening, configured for preventing leakage of the liquid from the duct through the corresponding through opening, wherein the detection arrangement further comprises at least two blocking members, outside the duct, each blocking member being configured for co-operating mechanically with the hydraulic body and with a respective electrode unit in order to fix the electrode unit in position, wherein each electrode unit is inserted into the respective through opening from outside the duct, such that the respective widened portion remain on the outside of the through opening and the duct, wherein the electrically insulating material of the hydraulic body defines, outside the duct and in a position corresponding to each of said through opening, an engagement seat for a respective blocking member, and each blocking member has at least one coupling portion configured for coupling in the respective engagement seat via an angular movement of the blocking member, to thereby fix in position the corresponding electrode unit and keep the corresponding sealing ring in an elastically compressed condition, wherein the hydraulic body moreover defines outside the duct, at each of the second sides, a mounting slit for a respective magnetic pole of the magnetic arrangement, wherein each electrode unit has an electrically conductive body made of metal or metal alloy and having a pin, and wherein each blocking member is made of an electrically insulating material and defines a passage, and wherein the pin of the electrically conductive body of each electrode unit protrudes from the passage defined in the corresponding blocking member, for connection to a corresponding electrical conductor, and wherein each engagement seat comprises a tubular projection, integrally defined by the hydraulic body in a position corresponding to said respective through opening, the tubular projection having a top outside the duct, wherein rising at two opposite sides of the top of the tubular projection are two opposite reliefs which defines two opposed recesses, in each of which is engageable said at least one coupling portion of the corresponding blocking member.

* * * * *